United States Patent
Frantz et al.

(10) Patent No.: US 9,626,422 B2
(45) Date of Patent: *Apr. 18, 2017

(54) SYSTEMS AND METHODS FOR RESLICING DATA IN A RELATIONAL DATABASE

(71) Applicant: Clustrix, Inc., San Francisco, CA (US)

(72) Inventors: Jason Frantz, San Francisco, CA (US); Sergei Tsarev, San Francisco, CA (US); Jim Gale, San Francisco, CA (US); Scott Smith, San Francisco, CA (US); Dan Adkins, Oakland, CA (US)

(73) Assignee: Clustrix, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/047,958

(22) Filed: Oct. 7, 2013

(65) Prior Publication Data

US 2014/0040318 A1 Feb. 6, 2014

Related U.S. Application Data

(63) Continuation of application No. 13/151,203, filed on Jun. 1, 2011, now Pat. No. 8,554,726.

(51) Int. Cl.
*G06F 17/30* (2006.01)

(52) U.S. Cl.
CPC .. *G06F 17/30595* (2013.01); *G06F 17/30306* (2013.01); *G06F 17/30584* (2013.01)

(58) Field of Classification Search
CPC ......... G06F 17/30595; G06F 17/30584; G06F 17/30306
USPC .................................................. 707/799, 613
See application file for complete search history.

(56) References Cited

U.S. PATENT DOCUMENTS

| | | | | |
|---|---|---|---|---|
| 6,047,356 | A * | 4/2000 | Anderson ........... | G06F 12/0866 707/999.104 |
| 6,728,713 | B1 * | 4/2004 | Beach et al. | |
| 6,732,124 | B1 * | 5/2004 | Koseki ................ | G06F 11/1435 |
| 7,328,226 | B1 * | 2/2008 | Karr .................... | G06F 11/1458 |
| 8,037,024 | B1 * | 10/2011 | Bozkaya et al. ............. | 707/637 |
| 8,209,284 | B1 * | 6/2012 | Bozkaya et al. ............. | 707/610 |

(Continued)

OTHER PUBLICATIONS

Muro et al., "Multi-Version Concurrency Control Scheme for a Database System*," Journal of Computer and System Sciences, 1984, pp. 207-224; vol. 29.

*Primary Examiner* — Albert Phillips, III

(74) *Attorney, Agent, or Firm* — Knobbe, Martens, Olson & Bear LLP

(57) ABSTRACT

Systems and methods for reslicing data in a representation of a relational database are disclosed. In one embodiment, the database includes a representation including a first slice. The database system creates a plurality of new slice and to create a plurality of write queues. The database system copies units of data in the first slice to the new slices according to a distribution function. The distribution function determines, for each unit of data in the first slice, one of the new slices into which to copy the unit of data. The database system asynchronously writes one or more actions of a set of one or more asynchronous database transactions to the first slice when copying the data in the first slice to the new slices. The database asynchronously enqueues the one or more actions of the set of asynchronous database transactions in the write queues according to the distribution function.

29 Claims, 22 Drawing Sheets

(56) References Cited

U.S. PATENT DOCUMENTS

| | | | |
|---|---|---|---|
| 8,751,740 B1* | 6/2014 | de Forest | G06F 3/061 711/114 |
| 2002/0091914 A1* | 7/2002 | Merchant et al. | 712/219 |
| 2004/0215905 A1* | 10/2004 | Armstrong et al. | 711/156 |
| 2004/0250029 A1* | 12/2004 | Ji | G06F 11/2066 711/162 |
| 2005/0223178 A1* | 10/2005 | Garcia et al. | 711/150 |
| 2008/0033964 A1* | 2/2008 | Richards et al. | 707/10 |
| 2009/0187787 A1 | 7/2009 | Jang et al. | |
| 2009/0259618 A1* | 10/2009 | Shi et al. | 707/2 |
| 2009/0313311 A1 | 12/2009 | Hoffmann et al. | |
| 2009/0327339 A1* | 12/2009 | Berger et al. | 707/103 Y |
| 2011/0225122 A1* | 9/2011 | Denuit et al. | 707/634 |
| 2012/0254175 A1* | 10/2012 | Horowitz et al. | 707/737 |

\* cited by examiner

1600

| representation | low | high | location | rows |
|---|---|---|---|---|
| S1 | 0 | 255 | 1 | 100 | ⟵ 1660
| ... | ... | ... | ... | ... |

| representation | low | high | location | rows |
|---|---|---|---|---|
| S1 | 0 | 127 | 2 | 50 | ⟵ 1760
| S1 | 128 | 255 | 3 | 50 | ⟵ 1770
| ... | ... | ... | ... | ... |

SYSTEMS AND METHODS FOR RESLICING DATA IN A RELATIONAL DATABASE

CROSS-REFERENCE TO RELATED APPLICATIONS

This application is a continuation of U.S. application Ser. No. 13/151,203, filed Jun. 1, 2011, and is related to U.S. application Ser. No. 13/151,203, filed Jun. 1, 2011, both of which are hereby expressly incorporated by reference in their entirety.

BACKGROUND

Field

The present application relates to systems and methods for reslicing data in a relational database.

Description of the Related Art

A relational database can include data in the form of representations, which can refer herein to tables (or "relations") and indices. A relation is a data structure which consists of a heading and an ordered or unordered set of tuples which share the same type. An index is a copy of one part of a table that can improve the speed of data retrieval operations by ordering the data in that part of the table. Representations can be organized into rows and columns. A database system can include a plurality of nodes, each of which can hold a portion of the data in the database. A node is a physical hardware component, which can include one or more processing elements, memory elements, and/or storage drives. Data in a representation can be stored entirely on one node. Alternatively, the data of a representation can be distributed among a plurality of nodes in sub-tables, which can be referred to as slices and can be spread throughout the plurality of nodes. By distributing data in a relational database across the slices, the scalability, reliability, availability and/or performance of the relational database can be improved.

Rows of data in a first slice can be copied to one or more new slices during database operations such as reslicing, redistribution, replication, failure recovery, node rebalancing, etc. During such operations, the first slice is locked while the data in the first slice is copied in order to preserve consistency between the data in the first slice and the new slices. While the first slice is locked, no data can be written to the first slice, and all processes that attempt to write to the first slice will wait until the data in the first slice is copied and the new slices are brought online. Because the process of copying the data in the first slice can take a significant amount of time, database operations on the first slice can be blocked for a period of time that is unacceptable to the user.

There is a need for improved systems and methods of reslicing data in a relational database system. Additionally, there is a need for improving the availability and performance of database queries while copying data from a slice.

SUMMARY

The systems, methods and devices of the present disclosure each have several innovative aspects, no single one of which is solely responsible for the desirable attributes disclosed herein.

In one embodiment a method of splitting a first slice of a representation in a distributed database into a plurality of new slices is disclosed. The method includes creating a plurality of write queues, each write queue corresponding to a different one of the new slices. The method further includes copying units of data in the first slice to the new slices according to a distribution function. The distribution function determines, for each unit of data in the first slice, one of the new slices into which to copy the unit of data. The method further includes asynchronously writing one or more actions of a set of one or more asynchronous database transactions to the first slice. Each transaction of the set of asynchronous database transactions is initiated after said creating of the write queues. The method further includes asynchronously enqueuing the one or more actions of the set of asynchronous database transactions in the write queues according to the distribution function. The method is performed by one or more computing devices.

In another embodiment, a distributed database system is disclosed. The distributed database system includes a reslicing system for splitting a first slice of a representation in the database into a plurality of new slices. The distributed database system further includes one or more computing devices operative to implement the reslicing system. The reslicing system is configured to create a plurality of new slices and to create a plurality of write queues. Each write queue corresponds to a different one of the new slices. The reslicing system is further configured to copy units of data in the first slice to the new slices according to a distribution function. The distribution function determines, for each unit of data in the first slice, one of the new slices into which to copy the unit of data. The reslicing system is further configured to asynchronously write one or more actions of a set of one or more asynchronous database transactions to the first slice. Each transaction of the set of asynchronous database transactions is initiated after the creation of the write queues. The reslicing system is further configured to asynchronously enqueue the one or more actions of the set of asynchronous database transactions in the write queues according to the distribution function.

In another embodiment, a computer-readable non-transitory storage medium is disclosed. The computer-readable non-transitory storage medium includes code for splitting a first slice of a representation in a database into a plurality of new slices. The code is capable of causing one or more computing devices to create a plurality of new slices and to create a plurality of write queues. Each write queue corresponds to a different one of the new slices. The code is further capable of causing one or more computing devices to copy units of data in the first slice to the new slices according to a distribution function. The distribution function determines, for each unit of data in the first slice, one of the new slices into which to copy the unit of data. The code is further capable of causing one or more computing devices to asynchronously write one or more actions of a set of one or more asynchronous database transactions to the first slice. Each transaction of the set of asynchronous database transactions is initiated after the creation of the write queues. The code is further capable of causing one or more computing devices to asynchronously enqueue the one or more actions of the set of asynchronous database transactions in the write queues according to the distribution function.

In another embodiment, a method of splitting a first slice of a representation in a distributed database into a plurality of new slices is disclosed. The method comprises creating the new slices and creating a plurality of write queues. Each write queue corresponds to a different one of the new slices. The method further comprises copying units of data in the first slice to the new slices according to a distribution function. The distribution function determines, for each unit of data in the first slice, one of the new slices into which to copy the unit of data. The method further comprises writing one or more actions of one or more database transactions to the first slice after beginning said copying. The method further comprises enqueuing the one or more actions of the one or more database transactions in the write queues according to the distribution function. The method further comprises replaying the actions in the write queues to the new slices, activating the new slices, and deactivating the first slice. The method is performed by one or more computing devices.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Specific embodiments of the invention will now be described with reference to the following drawings, which are provided by way of example, and not limitation.

FIG. 16 is a schematic diagram illustrating a state of a hash ranges table, before reslicing, in accordance with one embodiment.

FIG. 17 is a schematic diagram illustrating a state of a shadow hash ranges table, in accordance with one embodiment.

DETAILED DESCRIPTION

Figure 1:
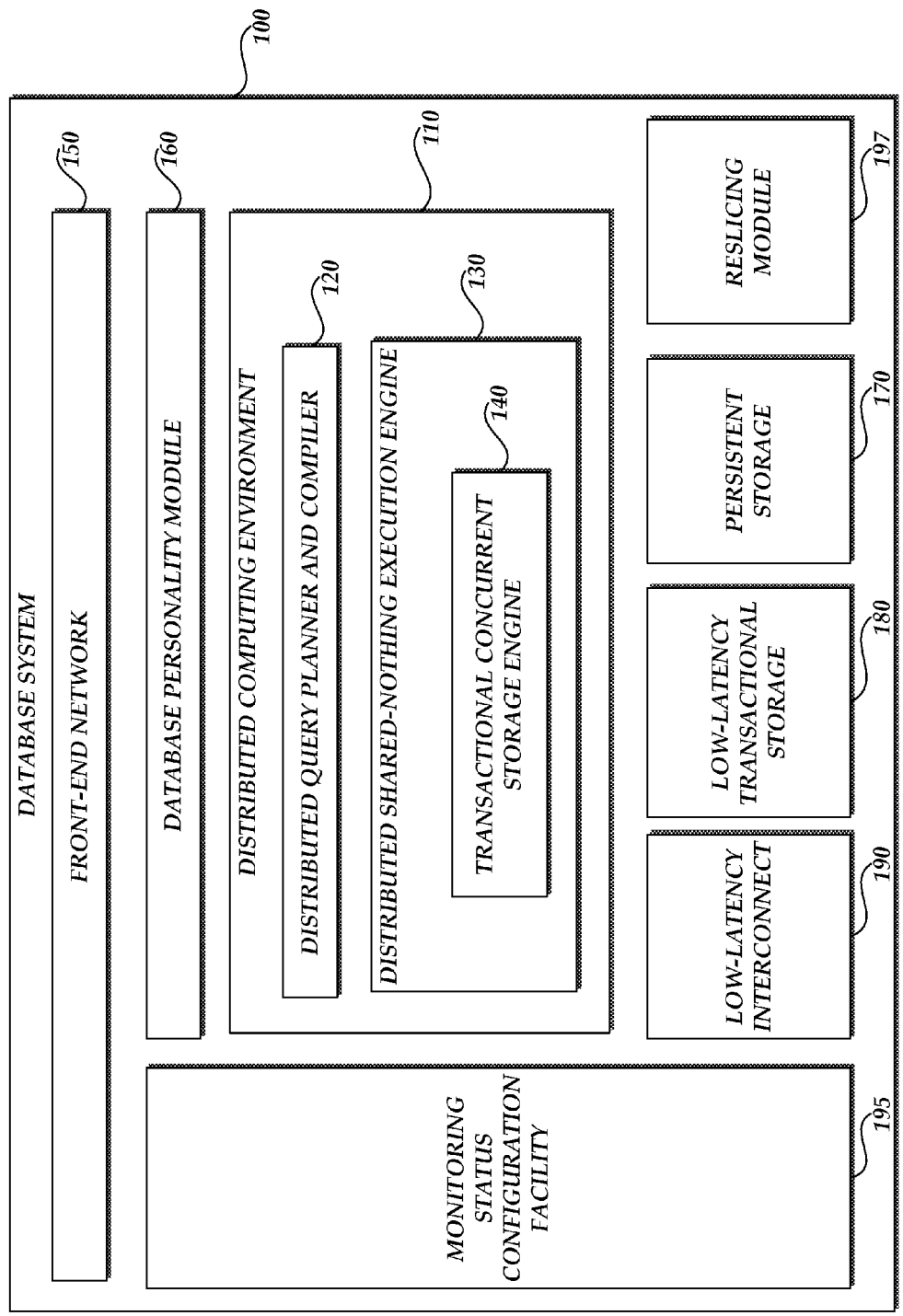
FIG. 1 is a schematic diagram of one example of a relational database system.

The following detailed description presents various descriptions of specific embodiments of the invention. However, the invention can be embodied in a multitude of different ways as defined and covered by the claims. In this description, reference is made to the drawings where like reference numerals indicate identical or functionally similar elements.

Relational Database Overview

FIG. 1 is a schematic diagram of one example of a relational database system 100. The illustrated database system 100 includes a distributed computing environment 110 that includes a distributed query planner and compiler 120 and a distributed shared-nothing execution engine 130. The distributed shared-nothing execution engine 130 includes a transactional concurrent storage engine 140. In the illustrated embodiment, queries enter the database system 100 through a front-end network 150 and are translated by a database personality module 160 to an internal representation used by the distributed computing environment 110. The distributed computing environment 110 then executes the queries in parallel. The database system 100 uses a persistent storage 170 to store data, a low-latency transactional storage 180 to journal changes, and a low-latency interconnect 190 to communicate with other nodes in a cluster. In an embodiment, a monitoring, status, and configuration facility 195 is integrated into the database system 100. The database 100 can also include a reslicing module 197, which can be configured to perform a reslicing operation in which in which a slice of a representation in the database system 100 can be split up into two or more new slices. In an embodiment, the reslicing module 197 can be included in the distributed computing environment 110.

The database system 100 can include data organized in a collection of representations, which can include tables, and indices. The representations can each include one or more rows and one or more columns. Each column can represent an attribute of the representation, and each row can include a value associated with each column of the representation. The values can be in any suitable format, including, for example, numbers, character strings and/or a time format. The database system 100 can also include a plurality of nodes, each of which can hold a portion of the data in the database.

Figure 2:
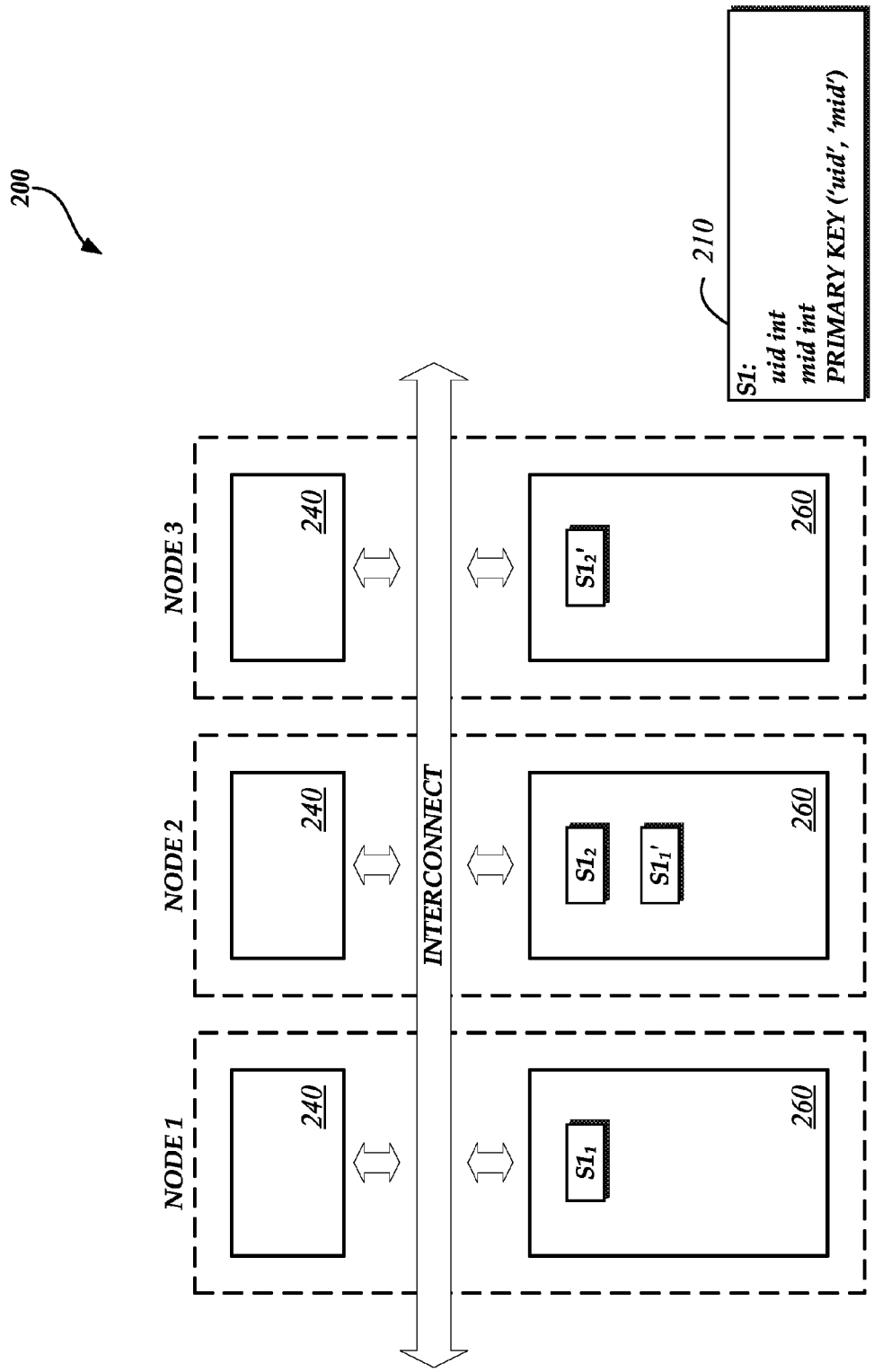
FIG. 2 is a schematic diagram of a data layout for a table of a relational database in accordance with one embodiment.

FIG. 2 is a schematic diagram of a data layout 200 for a table of a relational database in accordance with one embodiment. Schema 210 shows a physical representation of the data layout for a simple table, S1. The database system 100 can partition tables into objects called slices and those slices can have replicas for data redundancy. In the illustrated example, table S1 has two slices: $S1_1$ and $S1_2$. S1 resides on node 1, and $S1_2$ resides on node 2. Additionally, each slice has a replica labeled $S1_1'$ and $S1_2'$, respectively. The replicas of a slice can contain identical data and can be used interchangeably by the database system 100. There can be any number of slices per table, which can be determined by table size or other database statistics and parameters. The database system 100 can automatically and transparently split slices when they get too large. The number of slices can also be set by the user. The data placement of these slices and replicas throughout the database system 100 can be dynamically computed and updated. Slices can be moved while the database system 100 is online with no disruption to client queries. When a new node is added to the database system 100, data can be automatically moved there to rebalance the database system 100. When a drive or a node fails, the one or more slices that were contained on the failed device can be automatically reconstructed using the remaining resources in the database system 100.

A data cache in the database system 100 can be local to the node that contains the data. In the illustrated example, the slice $S1_1$ and its related cache reside on node 1. In contrast, a shared disk system, which pulls data to a node on which a query is run, can have high latency due to data movement around the database system 100 when queries are executed. Alternatively, a shared disk system can cache the data on the machine where the query is run. This can create many copies of the same data in cache, greatly reducing cache efficiency.

The distribution of data among the slices can be determined by a distribution function: dist(key). The distribution function can either be range-based or hash-based. The number of components in a compound key contributing to the distribution can be selected. Components that can be used in a compound key can include data values from one or more columns in a representation. In the example in FIG. 2, data can be distributed on ('uid') or the combination ('uid', 'mid').

Figure 3:
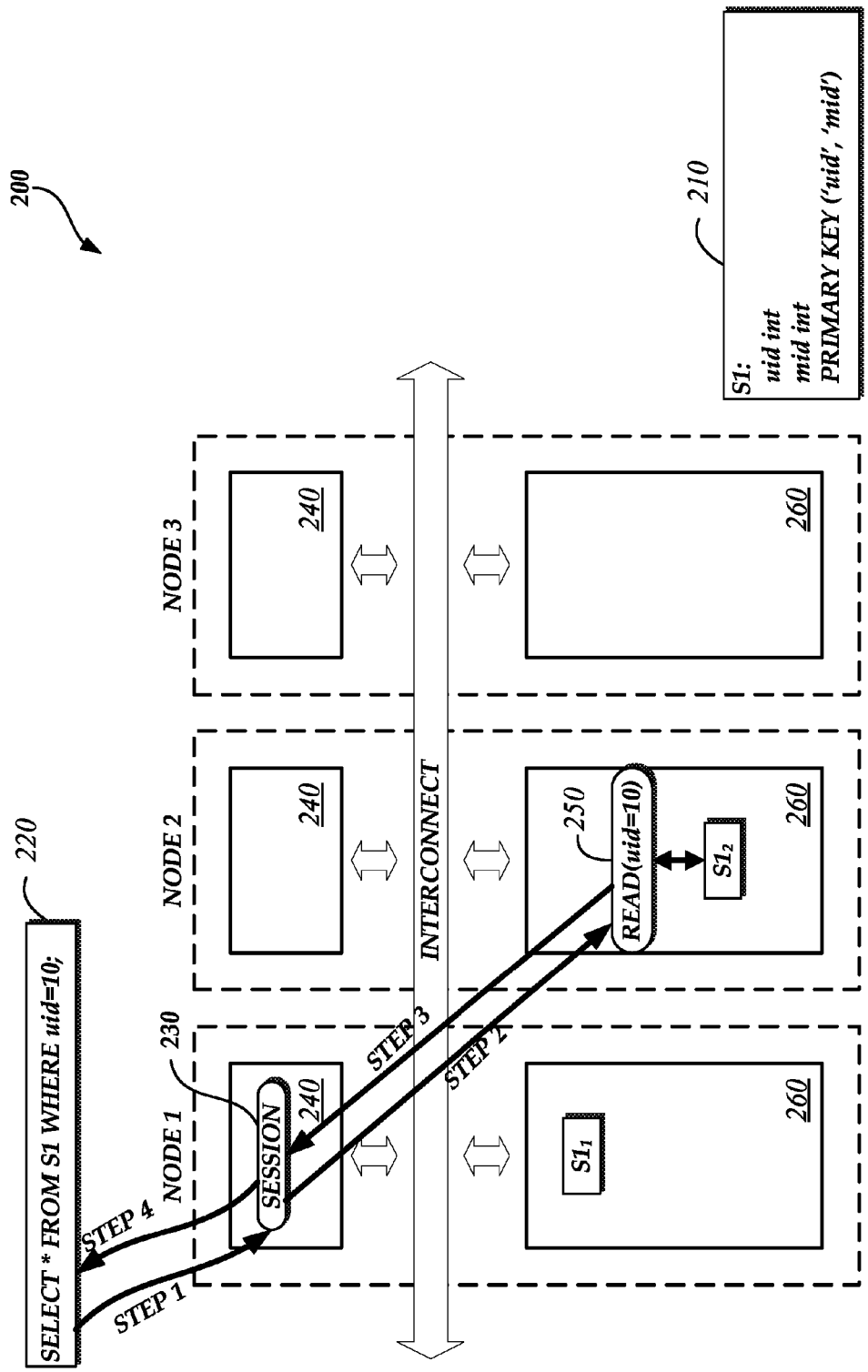
FIG. 3 is a schematic diagram of one example query performed on the table of FIG. 2.

FIG. 3 is a schematic diagram of one example query performed on the table S1 of FIG. 2. In the illustrated example, a client's point select query 220 is processed by the database system 100. For clarity, the replicas $S1_1'$ and $S1_2'$ have been removed from the diagram, but can remain part of the database in some embodiments. In the illustrated example, the query 220 creates the client's session 230 on node 1. In step 1, a database system planner 240 generates a plan by parsing the query 220, creating a query fragment 250. This plan is executed in the execution engine 260. Using the distribution function dist(uid=10), the database system 100 decides $S1_2$ is the slice that contains the relevant data. In step 2, the query fragment 250, along with any necessary constants (uid=10) is sent to node 2. In this case, the query fragment 250 performs a container read, finds all rows matching the constraint uid=10, and returns the rows in step 3. The returned rows are then sent back to the client in step 4. In the illustrated embodiment, the point select query 220 involves no global table or row level locks. Instead, database system 100 performs the query using Multi-Version Concurrency Control (MVCC) to ensure consistent data is returned.

Figure 4:
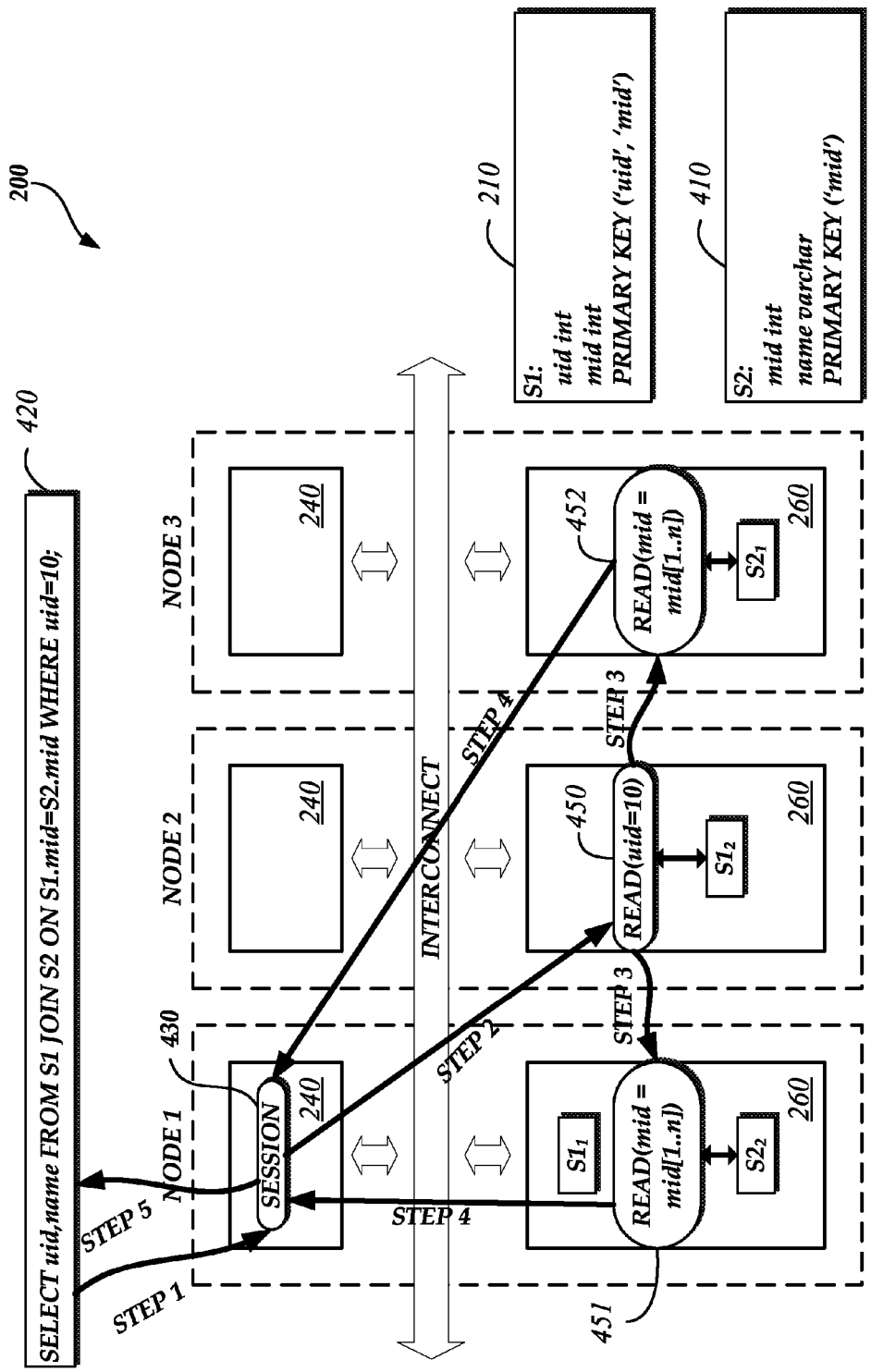
FIG. 4 is a schematic diagram of another example query performed on the table of FIG. 2.
Figure 5:
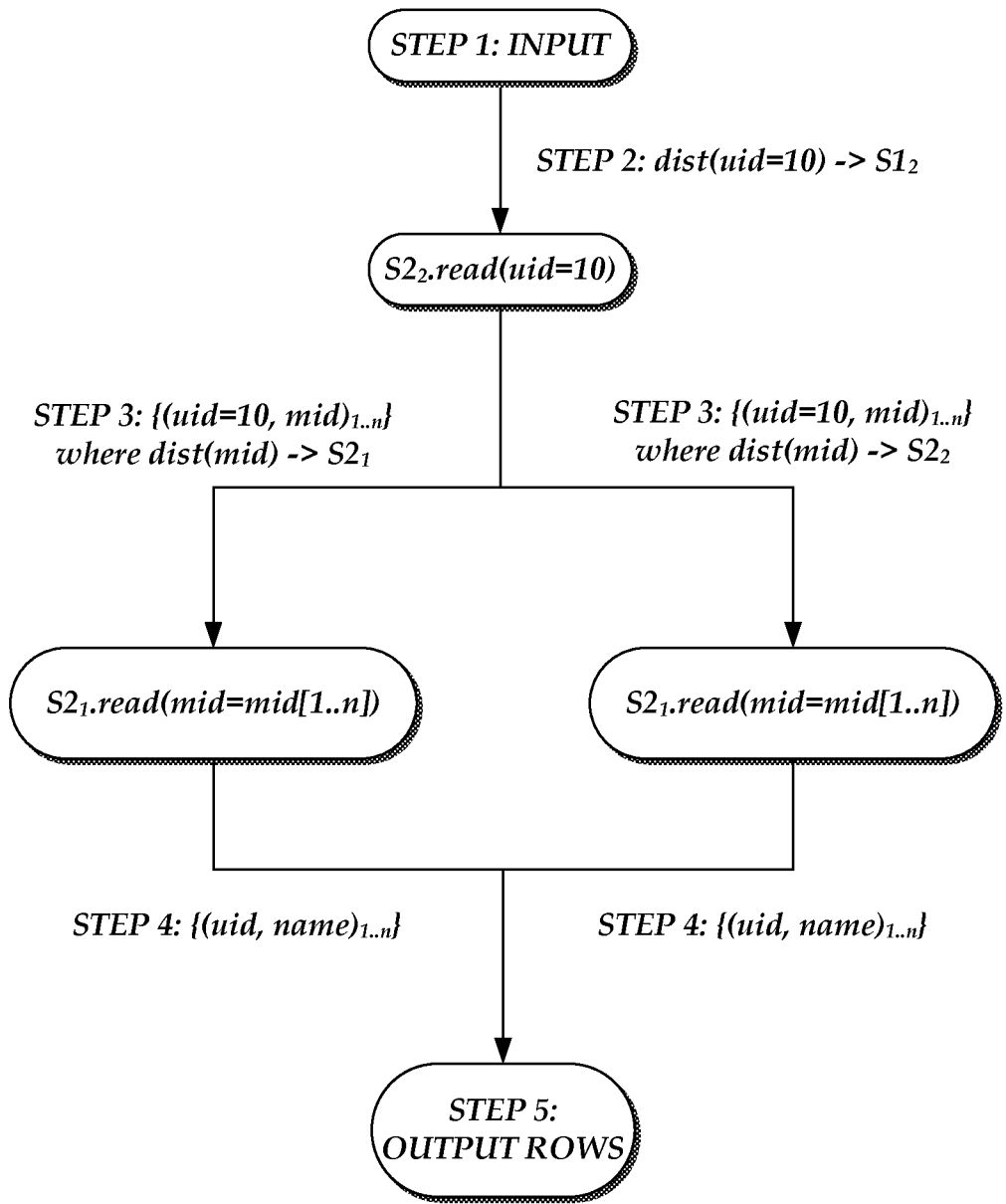
FIG. 5 is a dependency graph of the example query of FIG. 4.

FIG. 4 is a schematic diagram of another example query 420 performed on the table S1 of FIG. 2. FIG. 4 illustrates a two-table join query 420 with a constraint. Schema 410 shows a physical representation of the data layout for another table, S2. In the illustrated example, as with the point select query 220 of FIG. 3, the query comes in, gets compiled down to machine code query fragments 450, 451, 452, and is routed to nodes 1, 2, and 3 for query resolution. The rows are sent back to the client. In the illustrated example, the planner 240 has flexibility in join order, access path (which index it uses), general operation ordering, distribution, and parallelism. The database system 100 can use a variety of statistics to make intelligent decisions when making a plan whereby query fragments are generated and routed. For this example, the generated plan is illustrated in FIG. 5 as a dependency graph. The numbered steps in the dependency graph correspond with the steps in the physical representation.

FIG. 5 is a dependency graph of the example query of FIG. 4. In step 1, the SQL query 420 is compiled to machine code. In step 2, the query fragment 450 is sent to a slice determined by the distribution function dist(uid=10) of the first table of the join operation. There, the query fragment 450 finds all rows that match the constraint uid=10. In step 3, the database system 100 forwards the matched rows returned by query fragment 450 along with additional query fragments 451, 452 to the appropriate slices. The database system uses a distribution function dist(mid) to decide where to forward each row retrieved from the slice $S1_2$. Slices $S2_1$ and $S2_2$ are read to find the rows that match the S1.mid=S2.mid constraint. In step 4, the appropriate result rows are sent to the session 430. In step 5, the result is sent to the client. In the illustrated embodiment, only the relevant columns of the necessary rows are sent at each stage. Thus, (uid,mid) is sent in step 3 and (uid,name) is sent in step 4.

Embodiments of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A Local Area Network (LAN) or Wide Area Network (WAN) may be a corporate computing network, including access to the Internet, to which computers and computing devices comprising the system are connected. In one embodiment, the LAN conforms to the Transmission Control Protocol/Internet Protocol (TCP/IP) industry standard.

A microprocessor may be any conventional general purpose single- or multi-chip microprocessor such as a Pentium® processor, Itanium® processor or an ALPHA® processor. In addition, the microprocessor may be any conventional special purpose microprocessor such as a digital signal processor (DSP) or a graphics processor.

Embodiments of the system are comprised of various modules as discussed in detail below. As can be appreciated by one of ordinary skill in the art, each of the modules can comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as LINUX, UNIX or MICROSOFT WINDOWS®. The system may be written in any conventional programming language such as C, C++, BASIC, Pascal, Perl, or Java, and run under a conventional operating system.

Any embodiment of the invention disclosed herein may be implemented as a method, apparatus or article of manufacture using standard programming or engineering techniques to produce software, firmware, hardware, or any combination thereof. The term "article of manufacture" as used herein includes code or logic implemented in hardware or computer readable media such as optical storage devices, and volatile or non-volatile memory devices. Such hardware may include, but is not limited to, field programmable gate arrays (FPGAs), application-specific integrated circuits (ASICs), complex programmable logic devices (CPLDs), programmable logic arrays (PLAs), microprocessors, or other similar processing devices.

Reslicing Systems and Methods

The following disclosure describes an exemplary series of database transactions during a reslicing operation, in which a slice of a representation in a database is split up into two or more new slices. Each of the database transactions can include one or more actions, together with one or more computation steps. Actions can be primitive database operations such as reads or writes to a representation in a database. For example, an action can include a row insertion, a row deletion, a data lookup, etc. Actions can succeed when they are processed without error, and fail when there is a processing error. Exemplary processing errors can include hardware failures, database failures, and application failures. An example of a hardware failure is the failure of a disk drive (preventing data from being read or written). An example of a database failure is a node running out of memory (preventing new data from being written). An example of an application failure is an attempt to insert a duplicate primary key value (violating a database rule).

In some embodiments, transactions can implement queries using a structured query language (SQL), including, for instance, MySQL. In general, transactions are atomic, meaning that either all the actions in a transaction succeed or all the actions in a transaction fail. If some actions in a transaction fail after earlier actions complete, the database can roll-back the earlier actions in order to undo their effects.

In various embodiments, transactions can be synchronous or asynchronous. Synchronous transactions will block until each action in the transaction succeeds. In other words, synchronous transactions will wait for each action to succeed before moving on to the next action. Asynchronous transactions, on the other hand, do not wait for an action to succeed before moving on to the next action.

As described herein, various operations are described as being performed by abstractions such as transactions, queues, slices, etc. It will be understood by a person having ordinary skill in the art that the operations described as being performed by such abstractions can be implemented using one or more modules, sub-routines, procedures, definitional statements, and macros, which can be distributed across one or more hardware components of the database system 100. For example, one or more aspects of the following exemplary reslicing operation can be implemented by the reslicing module 197 of the database system 100.

Figure 6:
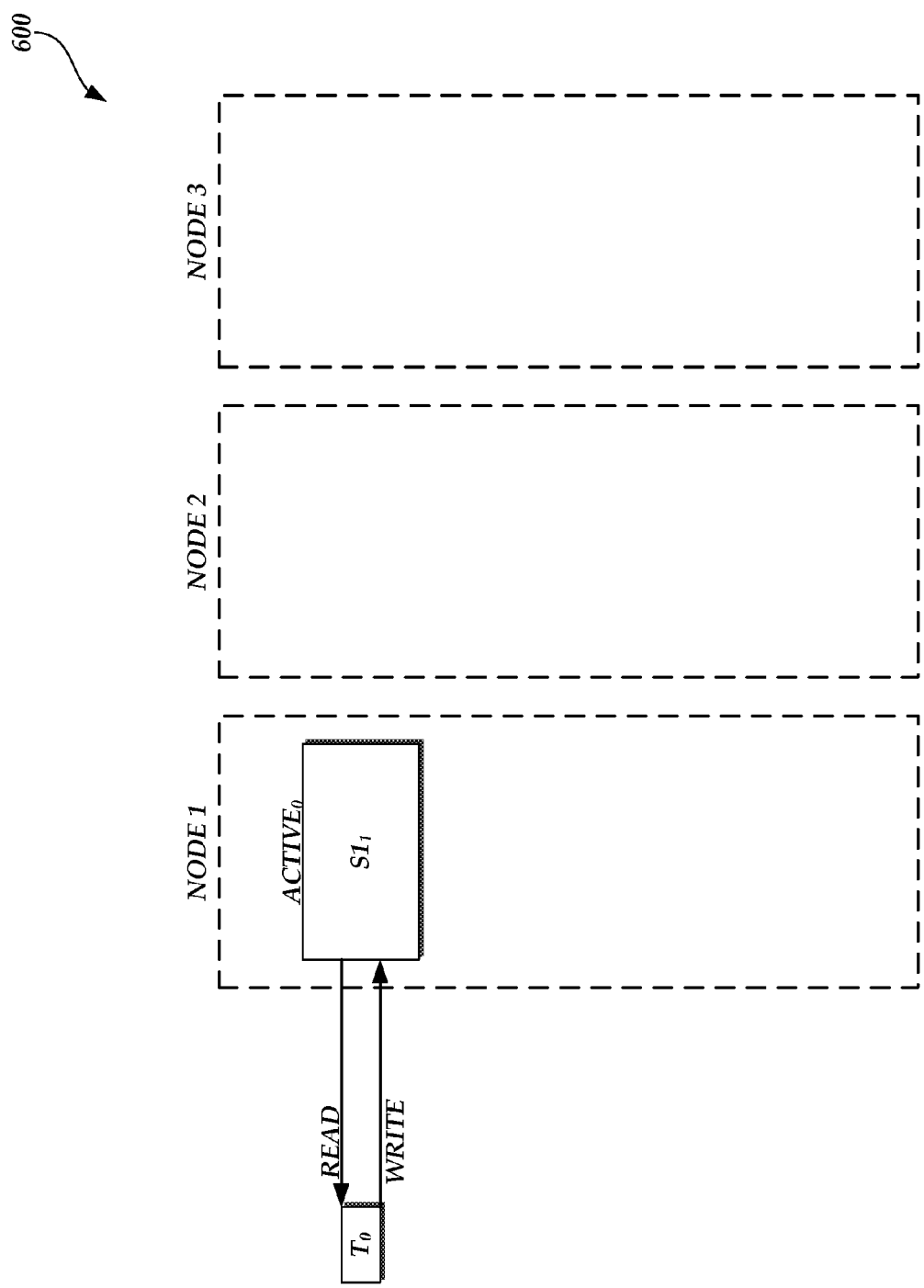
FIG. 6 is a schematic diagram of a data layout for a table of a relational database in accordance with one embodiment, shown at a reference time 0.

FIG. 6 is a schematic diagram of a data layout 600 for a table of a relational database in accordance with one embodiment, shown at a reference time 0. The data layout 600 can be implemented on a database system such as the database system 100, described above with respect to FIG. 1. In the illustrated embodiment, the data layout 600 includes three nodes 1, 2, and 3, and a table S1. Table S1 has one active slice, $S1_1$, which resides on node 1. Although table S1 is shown with only one active slice, a person having ordinary skill in the art will appreciate that the systems and methods described herein can be applied to tables having more than one active slice.

In certain embodiments, an "active" slice is a slice that is listed in the latest version of a table called a "hash ranges table." In an embodiment, the hash ranges table indicates the location of each slice of each representation in the database. The hash ranges table can also specify the slice in which a row of data is stored, based on where the output of a hash distribution function falls in a range of hash values. Exemplary hash ranges tables are shown in FIGS. 16 and 17, which are described below. It will be understood that the various details of the hash ranges tables described herein are exemplary, and can be modified to suit different applications.

Figure 23:
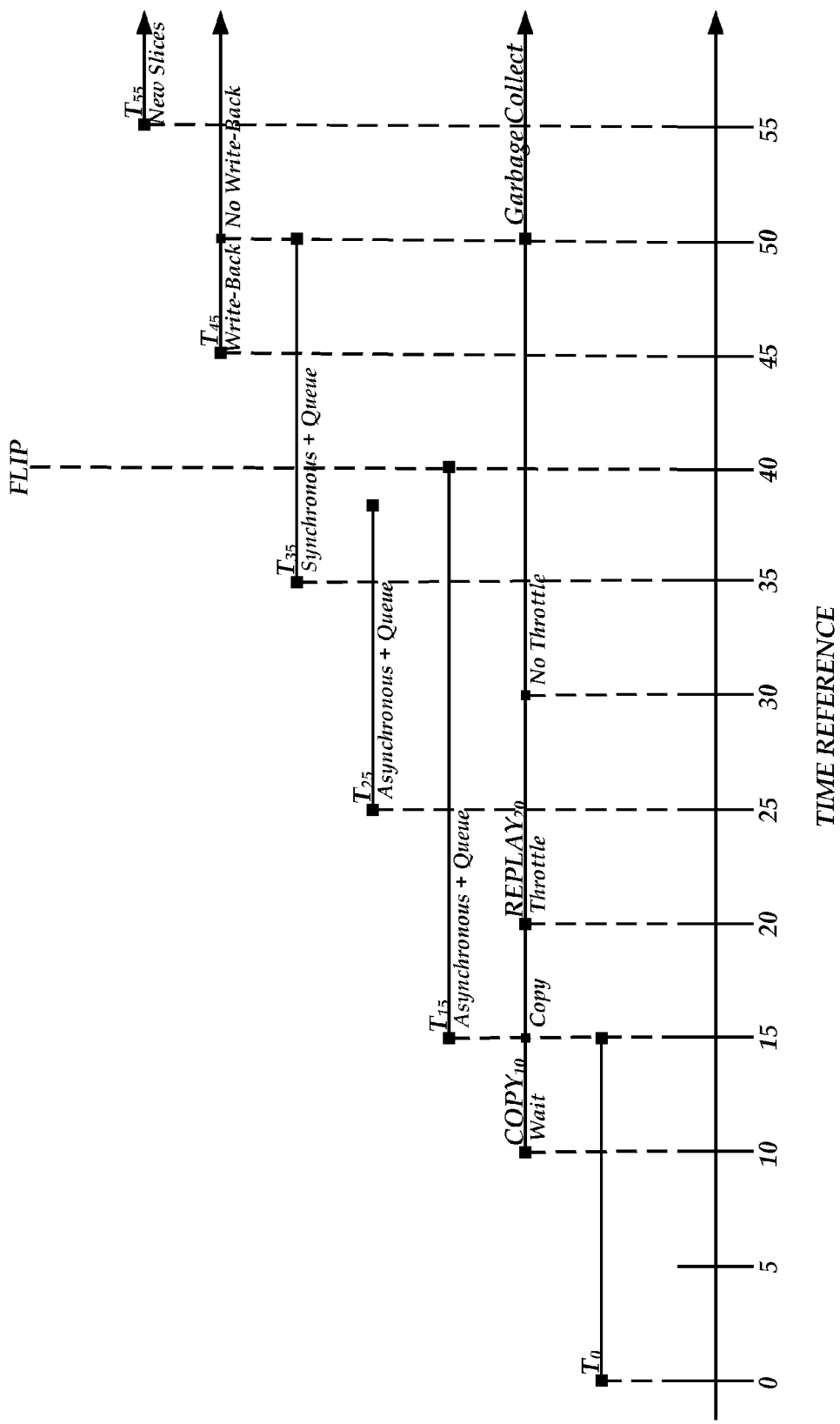
FIG. 23 is a schematic timeline of the events shown in FIGS. 6, 7, and 9-15.

FIGS. 6, 7, and 9-15 show an example series of events that illustrate embodiments of the invention. FIG. 23 is a schematic timeline of these events. The description of FIGS. 6-15 may be better understood with reference to FIG. 23, which is itself described in further detail below. Further, the discussion of FIGS. 6-15 involves a number of individual transactions. It will be understood that each of the single transactions discussed can represent a set of one or more transactions, which can have similar properties and temporal relationships to other transactions and database events.

Referring still to FIG. 6, a transaction $T_0$ is shown, having been initiated at reference time 0. When initiated, the transaction $T_0$ can take a snapshot of one or more aspects of the database state, for example, the hash ranges table or the table S1. By "snapshot," it is meant that the transaction $T_0$ can only access the state of the database at reference time 0. Particularly, in embodiments where the transaction $T_0$ takes a snapshot of the hash ranges table, the transaction $T_0$ will operate as if the hash ranges table is constant, even though the hash ranges table may change after the transaction $T_0$ is initiated. Because slice $S1_1$ is active at reference time 0, both read and write actions in the transaction $T_0$ are sent to the active slice $S1_1$.

Over time, more data may be written to the active slice $S1_1$. As the number of rows in the active slice S1 grows, it may be desirable to split the active slice S1 for reasons such as, for example, performance, reliability, and/or efficiency. In one embodiment, for example, a database system can decide to split a slice when it is larger than a predetermined and/or configurable size (e.g., one gigabyte). In another embodiment, a database system can decide to split a slice when it contains more than a predetermined and/or configurable number of rows (e.g., one million rows). The threshold criteria for splitting a slice can be programmable or dynamically calculated based on various database statistics. In various embodiments, a slice can be split when it passes a threshold amount of memory usage, CPU usage, network traffic, etc. A person having ordinary skill in the art will appreciate that the threshold for splitting a slice can be any appropriate value for the hardware and/or software used.

The process of splitting a slice may be referred to herein as a "reslicing operation." During a reslicing operation, a slice may be split into two or more new slices. Although the following exemplary embodiments describe the case of a single slice being split into two new slices, the systems and methods disclosed herein can be applied to any combination of original and new slices. For example, a single original slice can be split into three new slices. In some embodiments, a single original slice can be transferred or converted into a single new slice, which may be referred to as a "slice move." In various other embodiments, a plurality of original slices can be merged into a single new slice.

Figure 7:
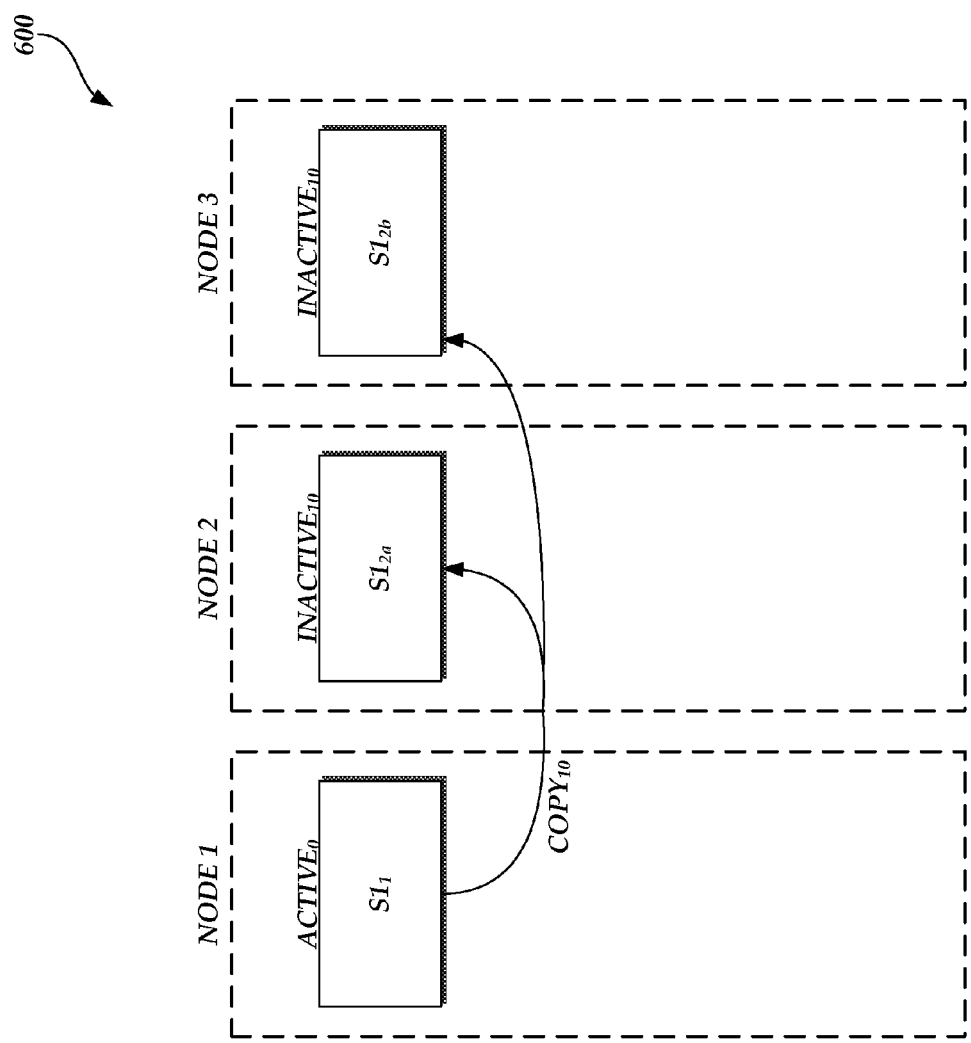
FIG. 7 is a schematic diagram of the data layout of FIG. 6, shown at a reference time 10 and during a copy operation, according to an embodiment.

FIG. 7 is a schematic diagram of the data layout 600 of FIG. 6, shown at a reference time 10 and during a copy operation. In the illustrated embodiment, the database system prepares to split the active slice $S1_1$ into a first new slice $S1_{2a}$ and a second new slice $S1_{2b}$. The database system has created the first new slice $S1_{2a}$ on node 2 and the second new slice $S1_{2b}$ on node 3. At reference time 10, the database system initiates a copy operation $COPY_{10}$.

The copy operation $COPY_{10}$ reads rows of data out of the original slice $S1_1$, and writes each row of data to either the first new slice $S1_{2a}$ or the second new slice $S1_{2b}$. In order to determine which new slice to write a given row of data into, the copy operation $COPY_{10}$ refers to a new distribution function. In one embodiment, the database system creates a shadow version of the hash ranges table, in which the original slice $S1_1$ is replaced by the first new slice $S1_{2a}$ and the second new slice $S1_{2b}$. In the shadow version of the hash ranges table, the new slices $S1_{2a}$, $S1_{2b}$ can each be assigned a portion of the hash range originally assigned to the original slice $S1_1$. In an embodiment, the shadow version of the hash ranges table is not directly visible to new transactions. In another embodiment, the database system can store distribution information for the new slices $S1_{2a}$, $S1_{2b}$ in the original hash ranges table, perhaps making it unnecessary to create a shadow version of the hash ranges table. In an embodiment, the distribution information for the new slices $S1_{2a}$, $S1_{2b}$ can be marked in the original hash ranges table as inactive and/or available only for queued writing.

In an embodiment, when the copy operation $COPY_{10}$ is initiated at reference time 10, a transaction initiated before reference time 10 may still be running. For example, the transaction $T_0$, shown in FIG. 6, may not complete until reference time 15. In order to preserve the consistency of the data being copied, a copy operation can wait for transactions initiated before reference time 10 to finish. For example, the copy operation $COPY_{10}$ can wait for the transaction $T_0$ to finish before beginning to read data from the original slice $S1_1$.

Figure 8:
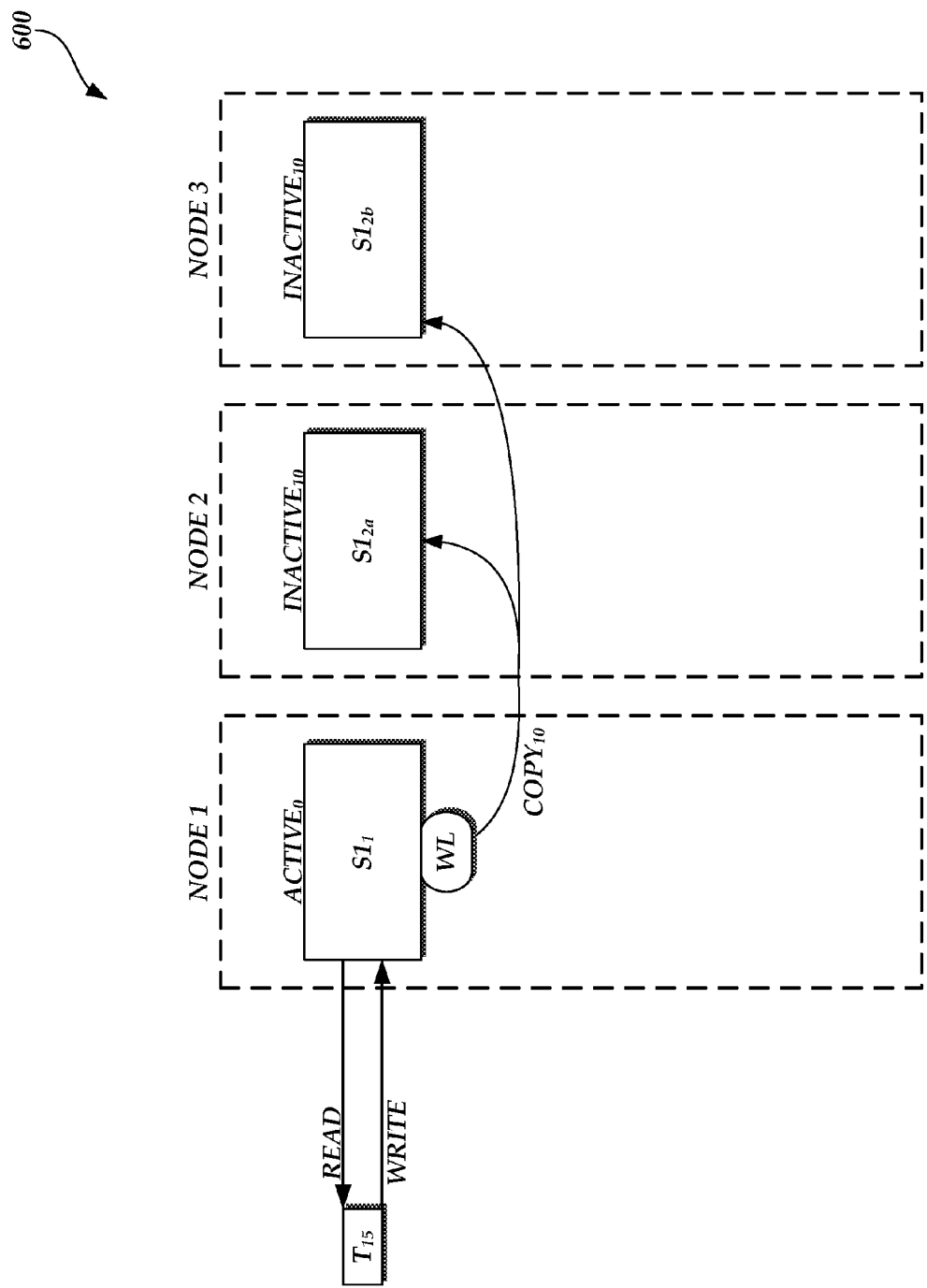
FIG. 8 is a schematic diagram of the data layout of FIG. 6, shown at a reference time 15, according to one approach to a reslicing operation.

FIG. 8 is a schematic diagram of the data layout 600 of FIG. 6, shown at a reference time 15, according to one approach to a reslicing operation. In FIG. 8, the copy operation $COPY_{10}$ takes out a write lock WL on the original slice $S1_1$ in order preserve the consistency of the data being copied. The write lock WL can prevent new transactions from writing to the active slice $S1_1$ during the copy operation $COPY_{10}$, which could create an inconsistency between the data in the active slice $S1_1$ and the new slices $S1_{2a}$, $S1_{2b}$.

In the illustrated approach to reslicing, the copy operation $COPY_{10}$ takes out the write lock WL on the original slice $S1_1$ when it is initiated at reference time 10. As discussed above with respect to FIG. 7, however, the copy operation $COPY_{10}$ may wait for earlier transactions to complete before beginning to read from the original slice $S1_1$. Accordingly, transactions initiated before the copy operation $COPY_{10}$ takes out the write lock WL on the original slice $S1_1$ may continue to write to the original slice $S1_1$ after reference time 10.

In FIG. 8, a transaction $T_{15}$ is shown, having been initiated at reference time 15. Because the transaction $T_{15}$ is initiated after the copy operation $COPY_{10}$ takes out the write lock WL on the original slice $S1_1$, it must wait until the copy operation $COPY_{10}$ is finished before it can write to the original slice $S1_1$. Although only one transaction is shown, there could be many transactions initiated after the copy operation $COPY_{10}$ takes out the write lock WL on the original slice $S1_1$, and they would all have to wait. Because the copy operation $COPY_{10}$ may take a long time to complete, the delay of the transaction $T_{15}$ may be unacceptable under a given database administration design. An alternative design without the write lock WL may be desirable.

Figure 9:
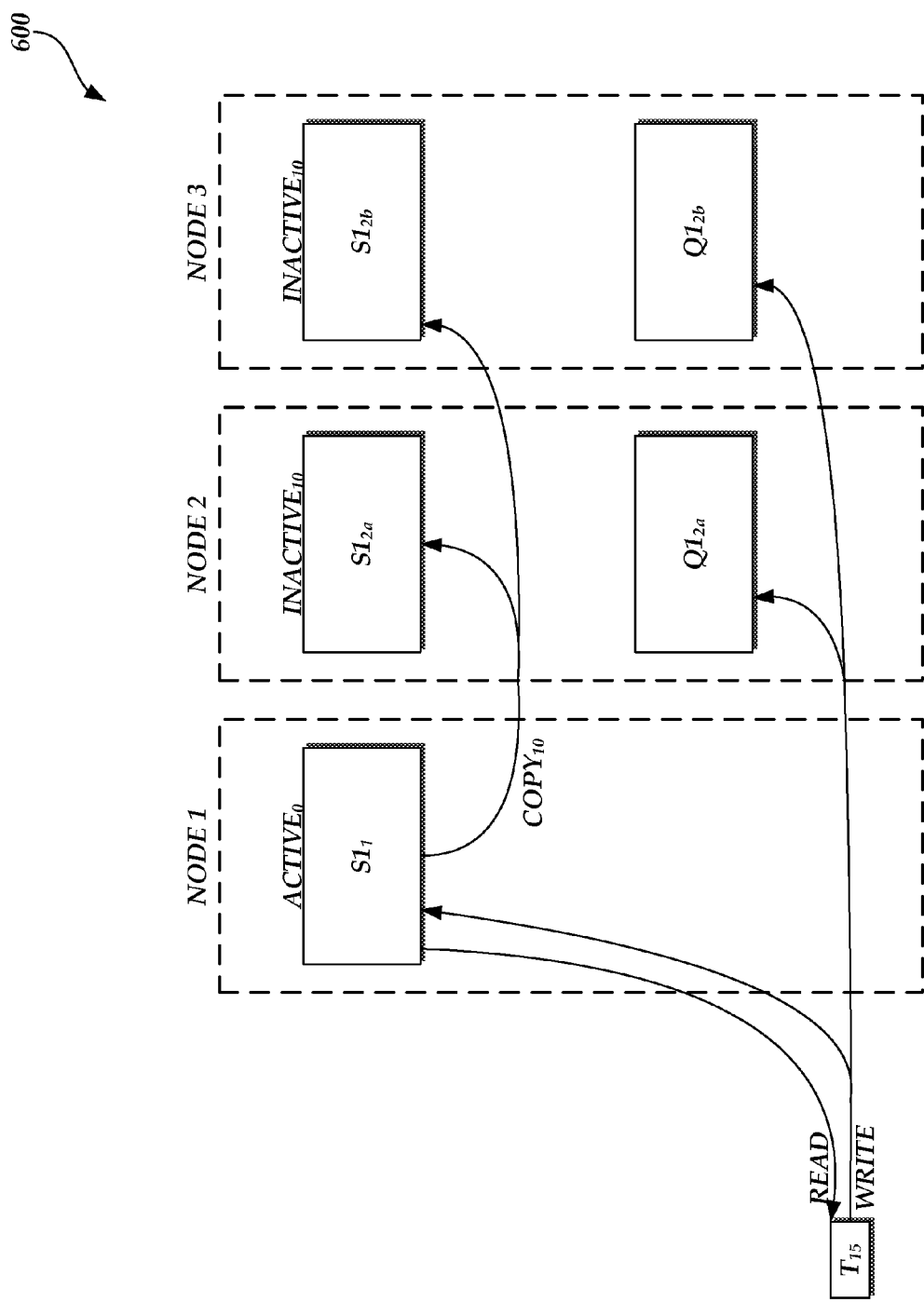
FIG. 9 is a schematic diagram of the data layout of FIG. 6, shown at a reference time 15, according to one embodiment.

FIG. 9 is a schematic diagram of the data layout 600 of FIG. 6, shown at a reference time 15, according to another embodiment. FIG. 9 shows an alternative approach to the reslicing operation. In contrast to the approach described above with respect to FIG. 8, in the illustrated embodiment, there is no write lock WL on the original slice $S1_1$. Instead, the database has created two write queues $Q1_{2a}$, $Q1_{2b}$. In an embodiment, a first write queue $Q1_{2a}$ can be associated with the first new slice $S1_{2a}$. Similarly, a second write queue $Q1_{2b}$ can be associated with the second new slice $S1_{2b}$. The write queues $Q1_{2a}$, $Q1_{2b}$ can serve to store actions from one or more database transactions for later replay into the corresponding database slices $S1_{2a}$, $S1_{2b}$. In general, it is preferable to create one new write queue for each new slice created by the reslicing operation, and to implement each write queue on the same node as the corresponding slice. In an embodiment, however, the write queues $Q1_{2a}$, $Q1_{2b}$ can be implemented by any node in the database system. In another embodiment, a write queue can be created for each slice replica. In general, embodiments described herein with respect to slices can also be implemented with respect to replicas of slices.

As shown in FIG. 9, the transaction $T_{15}$ is initiated at reference time 15. after the copy operation $COPY_{10}$ was initiated at reference time 10. In the illustrated embodiment, the copy operation $COPY_{10}$ does not block execution of the transaction $T_{15}$. Instead, the transaction $T_{15}$ is allowed to read and write from the original slice $S1_1$ as if the copy operation $COPY_{10}$ is not in process. Accordingly, the copy operation $COPY_{10}$ may copy some data from the original slice $S1_1$ that is later modified by a write action of the transaction $T_{15}$. Therefore, after the copy operation $COPY_{10}$ is complete, the data in the new slices $S1_{2a}$, $S1_{2b}$ may be inconsistent with the data in the original slice $S1_1$.

In order bring the data in the new slices $S1_{2a}$, $S1_{2b}$ to a consistent state with the data in the original slice $S1_1$, write actions of the transaction $T_{15}$ are also queued in the write queues $Q1_{2a}$, $Q1_{2b}$ during the copy operation $COPY_{10}$. Write actions in the transaction $T_{15}$ can be distributed between the write queues $Q1_{2a}$, $Q1_{2b}$ according to the same distribution function used by the copy operation $COPY_{10}$ to determine which slice each row of data is copied into. In an embodiment, write actions in the transaction $T_{15}$ can be distributed between the write queues $Q1_{2a}$, $Q1_{2b}$ according to entries in the shadow hash range table.

In the illustrated embodiment of FIG. 9, the system preferably categorizes transactions initiated during the copy operation $COPY_{10}$ as asynchronous transactions, and the system can be said to be in an asynchronous state. Accordingly, the asynchronous transaction $T_{15}$ sends write actions to the queues $Q1_{2a}$, $Q1_{2b}$ without waiting for confirmation that those actions have been successfully replayed into the new slices $S1_{2a}$, $S1_{2b}$ or notification that the replaying of the actions has failed. In an embodiment, when the system is in the asynchronous state with respect to a queue at the "commit time" of an asynchronous transaction (i.e., the time at which the asynchronous transaction makes its database changes permanent), the asynchronous transaction does not wait for the successful replay of write actions sent to the queue when the transaction "commits."

After the copy operation $COPY_{10}$ is complete, the data in the new slices $S1_{2a}$, $S1_{2b}$ may be inconsistent with the data in the original slice $S1_1$. The differences between the original slice $S1_1$ and new slices $S1_{2a}$, $S1_{2b}$ will be contained in the queues $Q1_{2a}$, $Q1_{2b}$. In order to bring new slices $S1_{2a}$, $S1_{2b}$ into consistency with the original slice $S1_1$, the write actions contained in the queues $Q1_{2a}$, $Q1_{2b}$ can be replayed into the new slices $S1_{2a}$, $S1_{2b}$.

Figure 10:
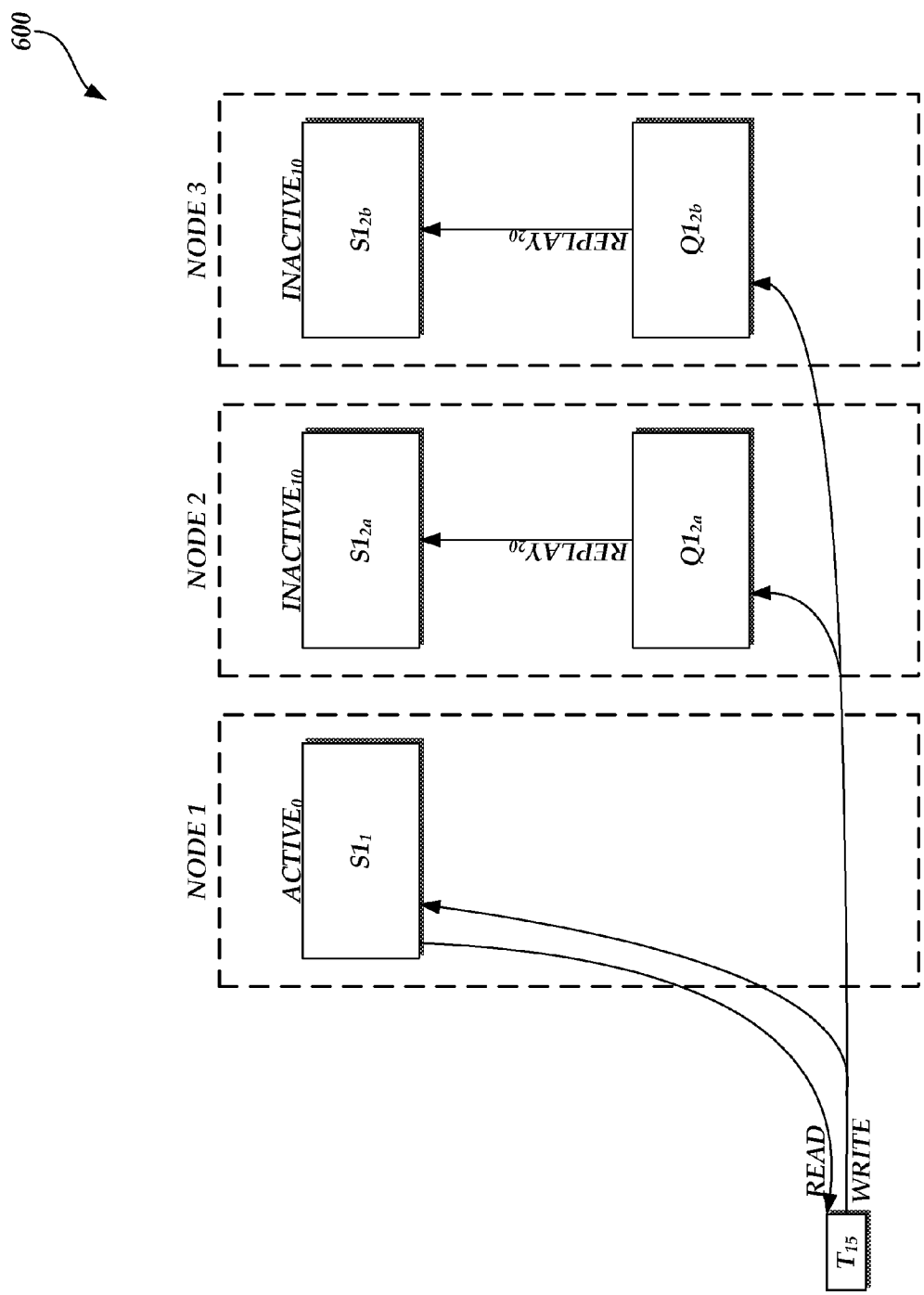
FIG. 10 is a schematic diagram of the data layout of FIG. 9, shown at a reference time 20, according to one embodiment.

FIG. 10 is a schematic diagram of the data layout 600 of FIG. 9, shown at a reference time 20. At reference time 20, the copy operation $COPY_{10}$ has completed, and the reslicing module 197 begins to replay write actions from the queues $Q1_{2a}$, $Q1_{2b}$ into their associated new slices $S1_{2a}$, $S1_{2b}$, respectively. The queues $Q1_{2a}$, $Q1_{2b}$ can replay write actions according to a first-in-first-out (FIFO) scheme. Accordingly, write actions can be replayed to the new slices $S1_{2a}$, $S1_{2b}$ in the same order in which they were sent to the original slice $S1_1$. In one embodiment, the queues $Q1_{2a}$, $Q1_{2b}$ can replay only the latest version of a given row. For example, where two actions in a queue each update the same row, the queues may only replay the most recent action.

When the queues $Q1_{2a}$, $Q1_{2b}$ begin to replay write actions at reference time 20, there may still be uncompleted transactions that were initiated during the copy operation $COPY_{10}$. For example, the asynchronous transaction $T_{15}$ may not complete until after reference time 20. Accordingly, the asynchronous transaction $T_{15}$ can continue to append new write transactions to the queues $Q1_{2a}$, $Q1_{2b}$ while the queues $Q1_{2a}$, $Q1_{2b}$ are replaying write actions to the new slices $S1_{2a}$, $S1_{2b}$. In various embodiments, there can be many uncompleted transactions that are initiated before the queue replay process begins. Additionally, new transactions can be initiated after the queue replay process begins.

Figure 11:
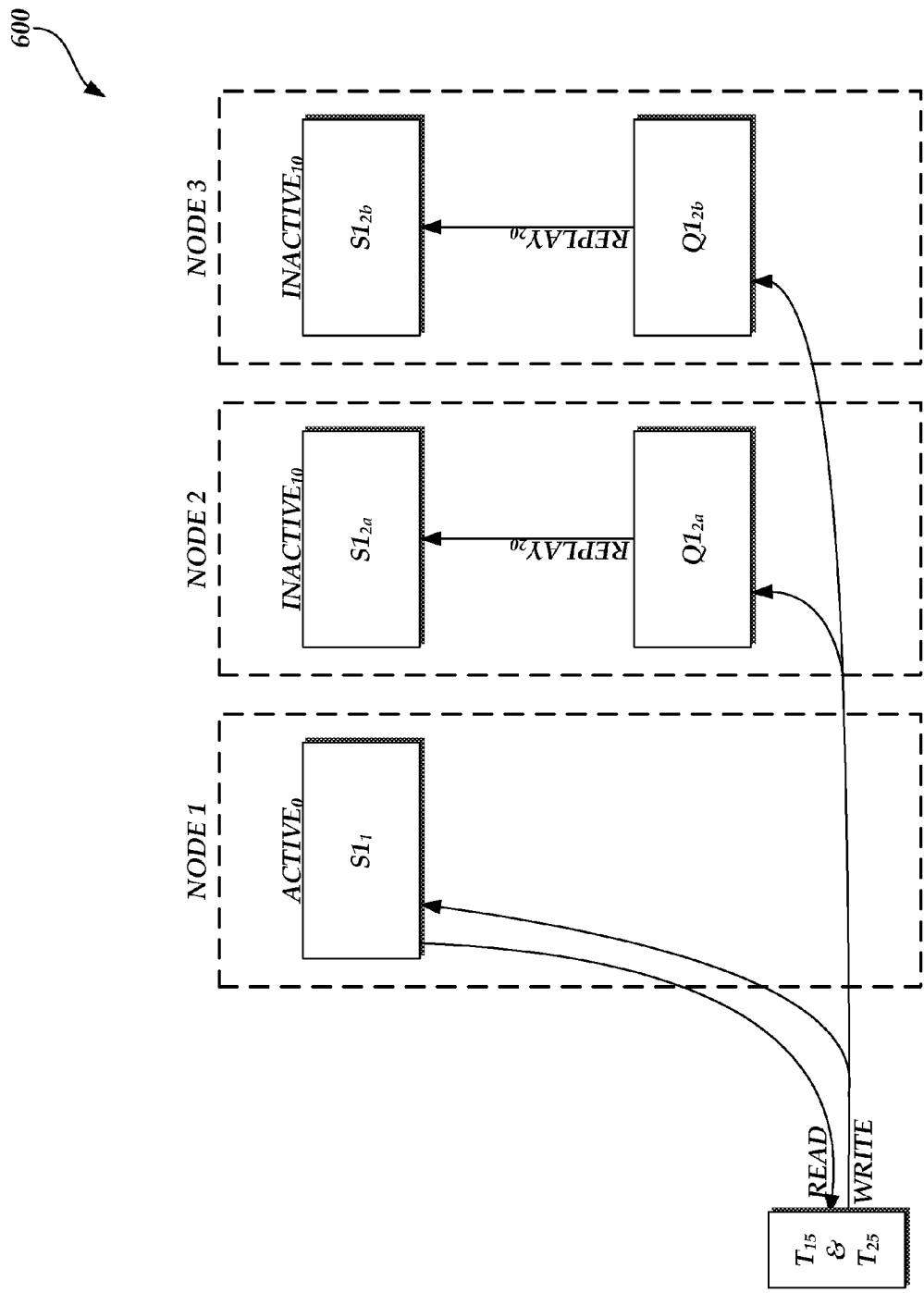
FIG. 11 is a schematic diagram of the data layout of FIG. 9, shown at a reference time 25, according to one embodiment.

FIG. 11 is a schematic diagram of the data layout 600 of FIG. 9, shown at a reference time 25. As shown, the asynchronous transaction $T_{15}$ continues to append new write transactions to the queues $Q1_{2a}$, $Q1_{2b}$, and the queues $Q1_{2a}$, $Q1_{2b}$ continue to replay write actions to the new slices $S1_{2a}$, $S1_{2b}$. Furthermore, a new transaction $T_{25}$ is initiated at reference time 25. The transaction $T_{25}$ reads and writes from the original slice $S1_1$. Since the transaction $T_{25}$ is initiated before the draining of the queues $Q1_{2a}$, $Q1_{2b}$ at a reference time 30 (described below), the system 100 can categorize the transaction $T_{25}$ as asynchronous and execute it asynchronously.

In order bring the data in the new slices $S1_{2a}$, $S1_{2b}$ up to date with the data in the original slice $S1_1$, write actions of the transaction $T_{25}$ are also queued in the write queues $Q1_{2a}$, $Q1_{2b}$. Write actions in the transaction $T_{25}$ can be distributed between the write queues $Q1_{2a}$, $Q1_{2b}$ according to the same distribution function used by the transaction $T_{15}$. In an embodiment, write actions in the transaction $T_{15}$ can be distributed between the write queues $Q1_{2a}$, $Q1_{2b}$ according to entries in the shadow hash range table.

Because there are many potential transactions writing to the queues $Q1_{2a}$, $Q1_{2b}$, actions may be enqueued in the queues $Q1_{2a}$, $Q1_{2b}$ at a faster pace than they are dequeued and replayed into the new slices $S1_{2a}$, $S1_{2b}$. In an embodiment, transactions writing to the queues $Q1_{2a}$, $Q1_{2b}$ can be slowed down, or throttled, in order to prevent the queues $Q1_{2a}$, $Q1_{2b}$ from growing indefinitely. The database can throttle one or more of the pending transactions, such as transaction $T_{15}$ alone, transaction $T_{25}$ alone, or both transaction $T_{15}$ and transaction $T_{25}$. In various embodiments, transactions can be throttled according to a priority, which can be determined based on criteria such as the size of a transaction, the running time of a transaction, estimated time to completion, an importance flag, etc.

In embodiments where transactions writing to the queues $Q1_{2a}$, $Q1_{2b}$ are throttled, and in embodiments where the queues $Q1_{2a}$, $Q1_{2b}$ naturally drain faster than incoming actions are enqueued, the queues $Q1_{2a}$, $Q1_{2b}$ can eventually drain completely. At a point where both queues $Q1_{2a}$, $Q1_{2b}$ are empty, the new slices $S1_{2a}$, $S1_{2b}$ are consistent with the original slice $S1_1$. In one example, the queues $Q1_{2a}$, $Q1_{2b}$ are completely empty at reference time 30. After this point, new transactions can be synchronous transactions. Because transactions can continue writing to the queues $Q1_{2a}$, $Q1_{2b}$, however, the queues $Q1_{2a}$, $Q1_{2b}$ may only be empty for a brief period.

Figure 12:
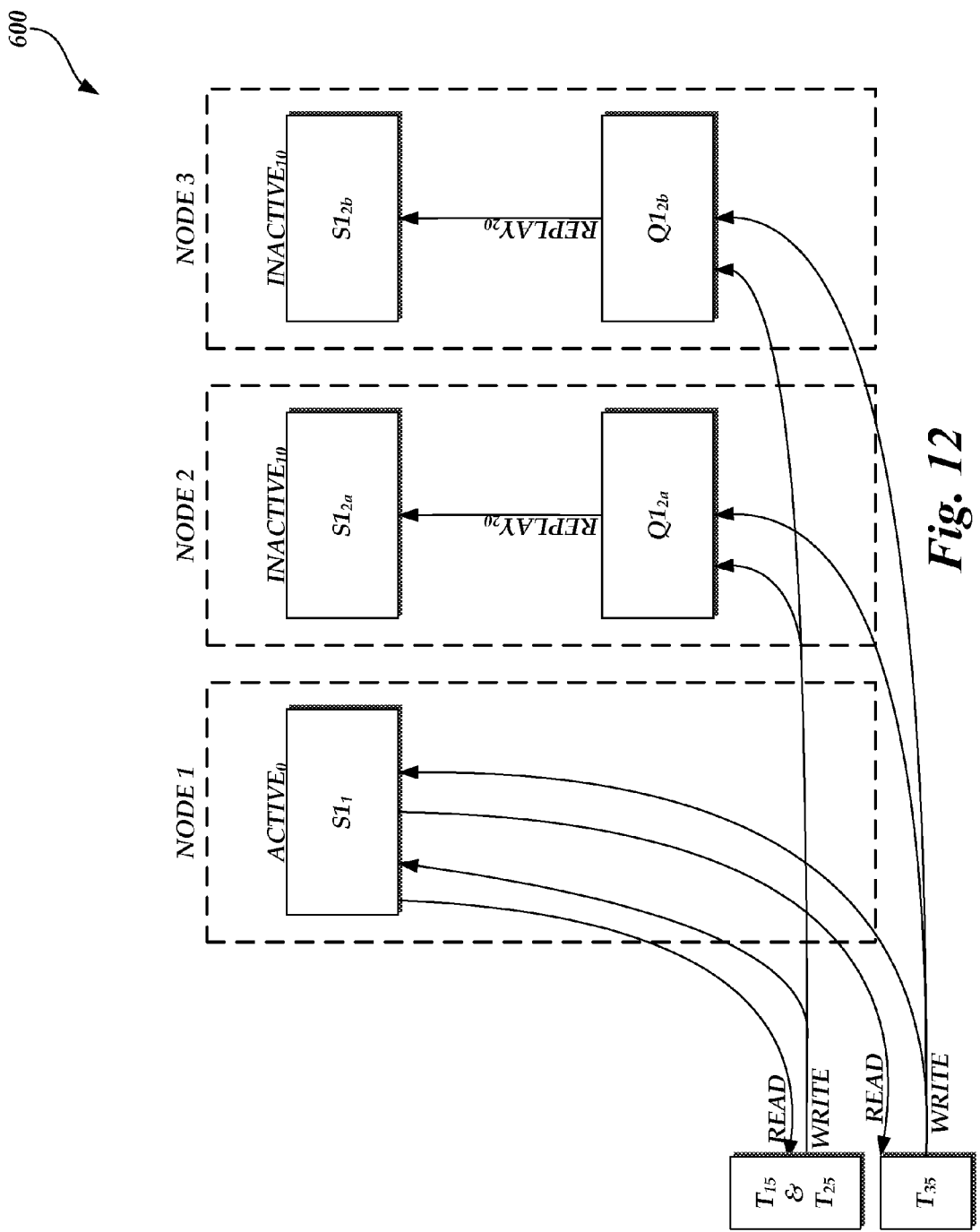
FIG. 12 is a schematic diagram of the data layout of FIG. 9, shown at a reference time 35, according to one embodiment.

FIG. 12 is a schematic diagram of the data layout 600 of FIG. 9, shown at a reference time 35. In the illustrated embodiment, a new transaction $T_{35}$ is initiated at reference time 35. The transaction $T_{35}$ reads and writes from the original slice $S1_1$. Because queues $Q1_{2a}$, $Q1_{2b}$ were empty at reference time 30 (before transaction $T_{35}$ was initiated), the database system 100 can categorize the transaction $T_{35}$ as synchronous and execute it synchronously. Accordingly, synchronous transaction $T_{35}$ sends write actions to the queues $Q1_{2a}$, $Q1_{2b}$ and waits for confirmation that those actions have succeeded or notification that they have failed. If the action succeeds, the synchronous transaction $T_{35}$ continues. If the action fails, the synchronous transaction $T_{35}$ aborts and previous actions of the synchronous transaction $T_{35}$ can be rolled back. (i.e. reversed, prevented from being committed to the database) by the database system 100.

In the illustrated embodiment, the asynchronous transactions $T_{15}$ and $T_{25}$ continue to append new write transactions to the queues $Q1_{2a}$, $Q1_{2b}$, and the queues $Q1_{2a}$, $Q1_{2b}$ continue to replay write actions to the new slices $S1_{2a}$, $S1_{2b}$. Because there are both synchronous and asynchronous transactions pending, the system can be said to be in a semi-synchronous state. In an embodiment, when the system is in the semi-synchronous state with respect to a queue at the commit time of an asynchronous transaction, the asynchronous transaction checks (at the commit time) for the successful replay of write actions sent to the queue. In such an embodiment, as noted above, the asynchronous transaction would not have checked for the successful replay of the write actions at the time the write actions were sent to the queue. For example, when the asynchronous transaction $T_{25}$ prepares to commit, it can check for the successful replay of write actions sent to the queues $Q1_{2a}$, $Q1_{2b}$. If any of the write actions sent to the queues $Q1_{2a}$, $Q1_{2b}$ fail during replay, the actions of the transaction $T_{25}$ can be rolled back (i.e., undone or prevented from being committed to the database).

In an embodiment, when the system is in the semi-synchronous state with respect to a queue, synchronous transactions (e.g., $T_{35}$) wait for the successful enqueuing of write actions to the queue. If any of the write actions fail during replay into the new slices, the actions of the synchronous transaction can be rolled back (i.e., undone or prevented from being committed to the database).

Referring still to FIG. 12, all new transactions are synchronous, and the remaining asynchronous transactions will eventually terminate. Once all the asynchronous transactions writing to the original slice $S1_1$ complete, only synchronous transactions will remain. At that point, the system can be said to be in a synchronous state. In an embodiment, when the system is in the synchronous state with respect to a queue, all transactions wait for the successful enqueuing of write actions to the queue. If any of the write actions sent to the queues fail during replay, the actions of the transaction can be rolled back (i.e., undone or prevented from being committed to the database).

Figure 13:
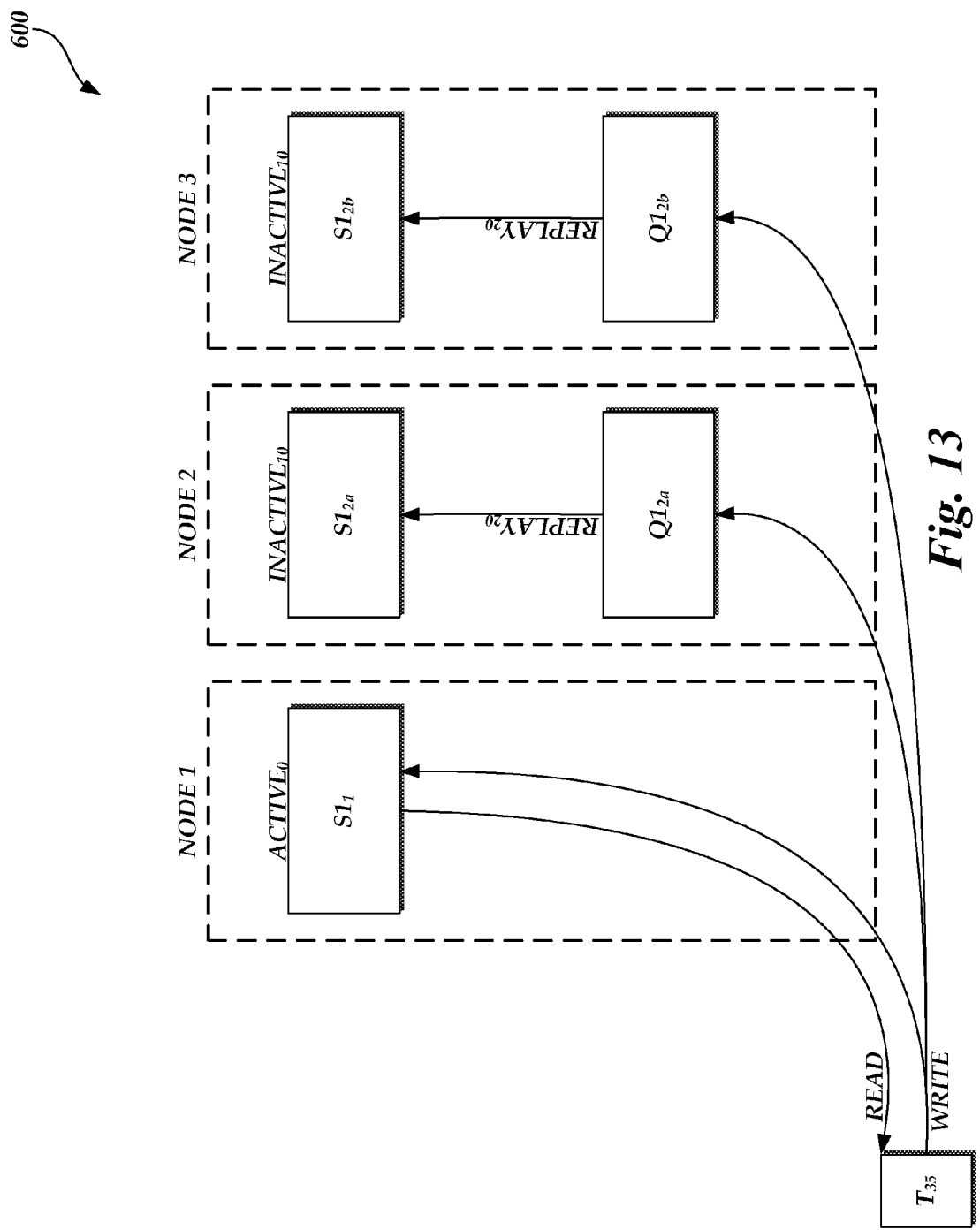
FIG. 13 is a schematic diagram of the data layout of FIG. 9, shown at a reference time 40, according to one embodiment.

FIG. 13 is a schematic diagram of the data layout 600 of FIG. 9, shown at a reference time 40. In the illustrated embodiment, the transaction $T_{35}$ continues to append new write transactions to the queues $Q1_{2a}$, $Q1_{2b}$, and the queues $Q1_{2a}$, $Q1_{2b}$ continue to replay write actions to the new slices $S1_{2a}$, $S1_{2b}$. At reference time 40, all asynchronous transactions (including transactions $T_{15}$ and $T_{25}$) have completed, and the system is in a synchronous state.

Synchronous transactions initiated before reference time 40, such as the transaction $T_{35}$, continue to read from the original slice $S1_1$ because it is the active slice. In an embodiment, the new slices $S1_{2a}$, $S1_{2b}$ can be activated after the asynchronous transactions complete. The process of activating the new slices $S1_{2a}$, $S1_{2b}$ can be referred to as a "flip" operation. During a flip operation, the hash ranges table can be updated with the new slices $S1_{2a}$, $S1_{2b}$, and the original slice $S1_1$ can be removed from the hash ranges table. In an embodiment, the hash ranges table can simply be replaced by the shadow hash ranges table.

Figure 14:
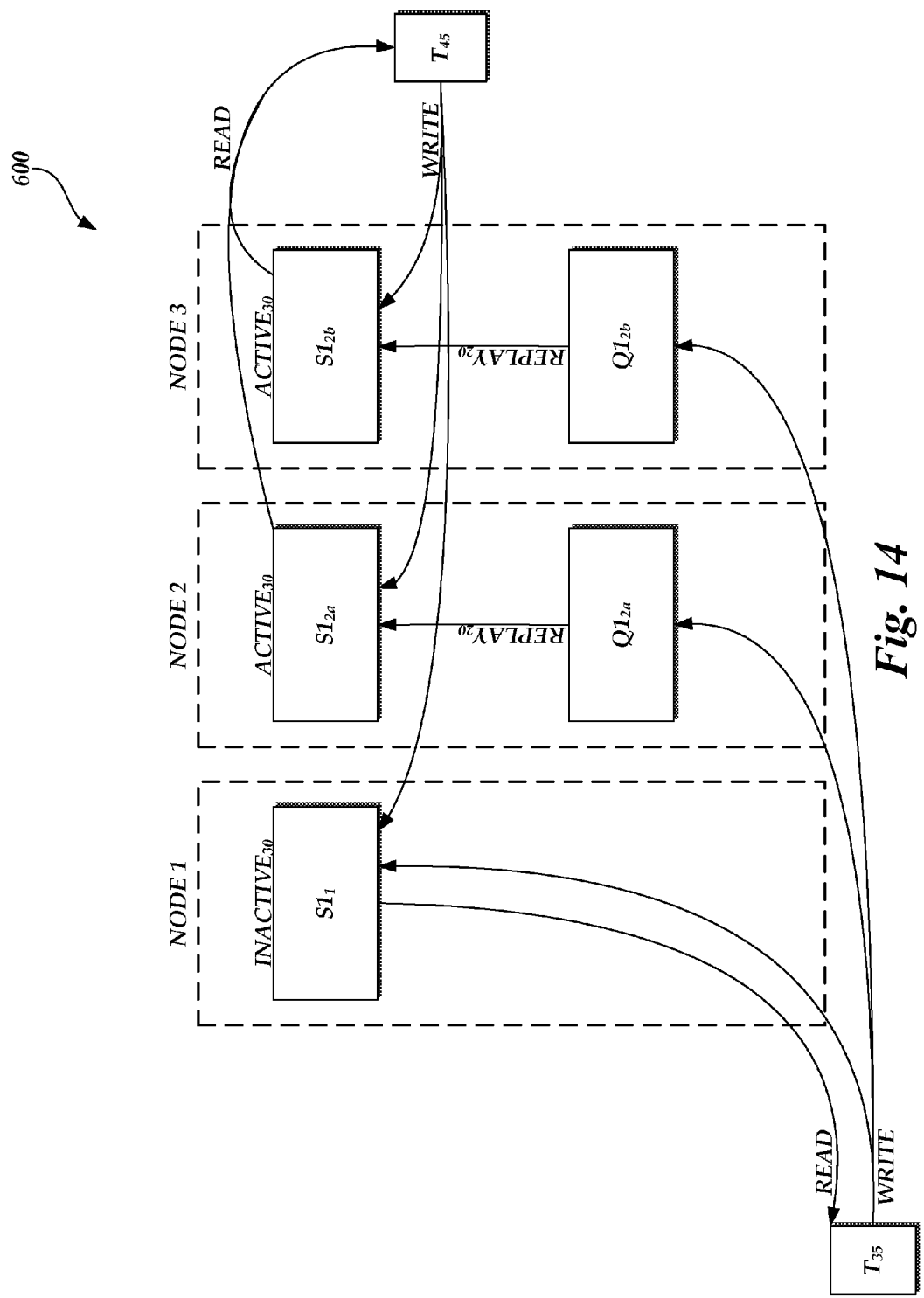
FIG. 14 is a schematic diagram of the data layout of FIG. 9, shown at a reference time 45, according to one embodiment.

FIG. 14 is a schematic diagram of the data layout 600 of FIG. 9, shown at a reference time 45. In the illustrated embodiment, at reference time 45, a flip operation has occurred. Transactions initiated before the flip (i.e., before reference time 40) will have taken a snapshot of the original hash ranges table. Accordingly, the transaction $T_{35}$ continues to read and write from the original slice $S1_1$, and to append new write transactions to the queues $Q1_{2a}$, $Q1_{2b}$. The queues $Q1_{2a}$, $Q1_{2b}$ continue to replay write actions to the new slices $S1_{2a}$, $S1_{2b}$.

Transactions initiated after the flip, on the other hand, take a snapshot of the new hash ranges table, in which the new slices $S1_{2a}$, $S1_{2b}$ are active. Accordingly, a new transaction $T_{45}$ reads and writes directly to the new slices $S1_{2a}$, $S1_{2b}$. The transaction $T_{45}$ can be referred to as a "new-slice" transaction or a "post-flip" transaction. The post-flip transaction $T_{45}$ bypasses the queues $Q1_{2a}$, $Q1_{2b}$ entirely. Because transactions initiated before the flip, such as the transaction $T_{35}$, continue to read from the original slice $S1_1$, there is a potential for inconsistency in the database. For example, the post-flip transaction $T_{45}$ might update a row X in the table $S1$ at a reference time 46 by writing to one of the new slices $S1_{2a}$, $S1_{2b}$. The synchronous pre-flip transaction $T_{35}$ might perform a read operation on row X at a reference time 47. Unless the write to the new slices $S1_{2a}$, $S1_{2b}$ is somehow forwarded to the original slice $S1_1$, the read operation performed by the synchronous pre-flip transaction $T_{35}$ can produce an incorrect result.

In order for transactions initiated before the flip to see modifications to the database made by transactions initiated after the flip, transactions initiated after the flip can operate in a "write-only" mode with respect to the original slice $S1_1$. For example, in order for the synchronous pre-flip transaction $T_{35}$ to see modifications to the database made by the post-flip transaction $T_{45}$, the post-flip transaction $T_{45}$ can forward its write actions to the original slice $S1_1$. Transactions initiated after the flip, however, need not wait for confirmation of writes to the original slice $S1_1$.

All transactions initiated after the flip, such as the post-flip transaction $T_{45}$, see the new slices $S1_{2a}$, $S1_{2b}$ as active. The remaining transactions, such as the synchronous transaction $T_{35}$, that see the old slice $S1_1$ as active will eventually terminate. Once all the transactions initiated before the flip complete (e.g., at a reference time 50), the queues $Q1_{2a}$, $Q1_{2b}$ will be empty. At this point, there will be no uncompleted transactions referencing the old slice or the queues $Q1_{2a}$, $Q1_{2b}$. In an embodiment, at this point, the database system can mark the old slice and the queues $Q1_{2a}$, $Q1_{2b}$ for deletion.

In one embodiment, the database system can wait for transactions operating in the write-only mode (i.e., post-flip transactions initiated before all the asynchronous transactions complete) with respect to the original slice to terminate before deleting the old slice $S1_1$. For example, the database system can wait for the transaction $T_{45}$ to terminate because it is configured to forward its write actions to the original slice $S1_1$. In another embodiment, the database can delete the original slice $S1$ while there are still uncompleted transactions operating in the write-only mode with respect to the original slice $S1_1$. In this case, transactions operating in the write-only mode with respect to the original slice can simply stop forwarding write actions to the original slice $S1_1$. For example, the transaction $T_{45}$ can stop forwarding write actions to the original slice $S1_1$ once the transaction $T_{35}$ completes at a reference time 50.

Figure 15:
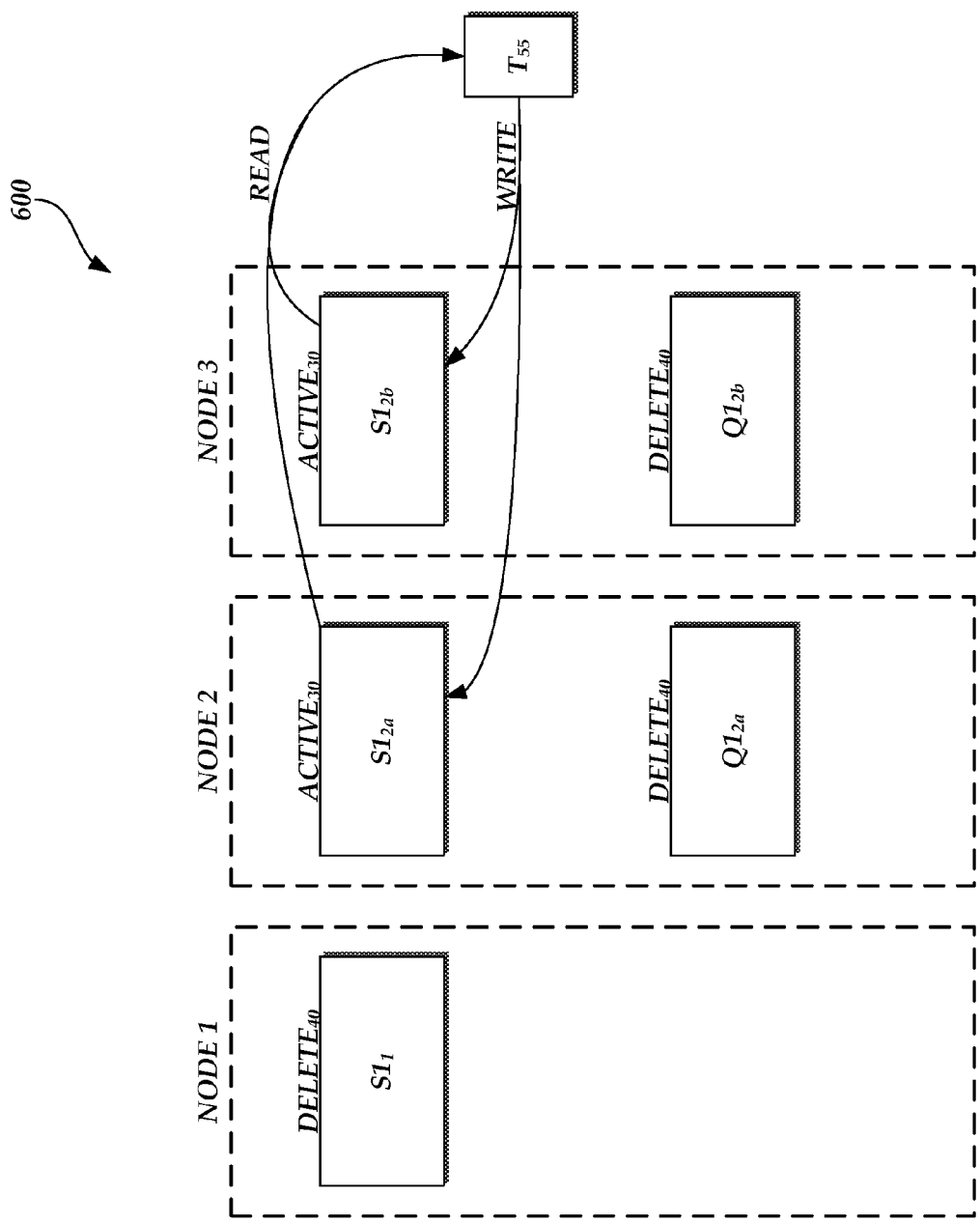
FIG. 15 is a schematic diagram of the data layout of FIG. 9, shown at a reference time 55, according to one embodiment.

FIG. 15 is a schematic diagram of the data layout 600 of FIG. 9, shown at a reference time 55. In the illustrated embodiment, a new transaction $T_{55}$ is initiated at reference time 55. All transactions initiated before the flip have terminated, and the original slice $S1$ and the queues $Q1_{2a}$, $Q1_{2b}$ have been marked for deletion. The transaction $T_{55}$ performs read and write actions directly on the new slices $S1_{2a}$, $S1_{2b}$ according to the distribution function and the post-flip hash ranges table. At this point, the reslicing operation is complete.

FIG. 16 is a schematic diagram illustrating a state of a hash ranges table 1600, before reslicing, in accordance with one embodiment. As shown, the hash ranges table 1600 includes a plurality of columns 1610, 1620, 1630, 1640, and 1650, and a row 1660. The hash ranges table 1600 can be used as a lookup table when determining where to store a particular row of a representation or where to send a query or query fragment.

For each row of the hash ranges table 1600, the 'representation' column 1610 stores the name of the representation for which that row contains distribution information. In FIG. 16, distribution information for the table S1 is shown. Although only distribution information for the table S1 is shown, the hash ranges table 1600 can nevertheless contain information for any one or more other representations in the database.

For each row of the hash ranges table 1600, the 'low' column 1620 and the 'high' column 1630 store the low and high values of a hash output range for which that row contains distribution information. As shown in FIG. 16, the table S1 contains only one hash range: 0-255. Accordingly, the table S1 has only one slice.

For each row of the hash ranges table 1600, the 'location' column 1640 stores the location of the slice where data that hashes into the hash range of that row is stored. For example, all rows in the table S1 are stored in node 1. In order to determine where to store the data in a row of the table S1, the value of one or more columns of the table S1 is input into a hash function. According to an exemplary hash function f(x)=x modulo 256, the output of the hash function would have to fall between 0 and 255. Therefore, in this case, the hash output falls into the hash range 0-255 of row 1660.

Accordingly, any row in the table S1 stored in node 1, as specified by the 'location' column 1640 of the row 1660 of the hash ranges table 1600.

Referring still to FIG. 16, in the illustrated embodiment, the 'location' column 1600 refers only to the node on which a slice is located. In various embodiments, the 'location' column 1640 can store a logical slice number, and the physical location of that slice number can be stored in a separate lookup table, or can be included in the hash ranges table 1640. For example, the hash ranges table 1600 can include additional columns specifying a logical slice number, a node number, and a drive number where the row data hashing to each hash range is stored. In various embodiments, multiple slices can be stored on the same node and drive, although the slices may or may not have a unique location identifier.

The 'rows' column 1650 stores the number of rows that are stored in the slice for each hash range. In various embodiments, the hash ranges table 1600 can additionally or alternatively store the number of bytes stored in each slice. In the illustrated embodiment, the table S1 contains 100 rows of data, all of which are located in a single slice.

In various embodiments, hash ranges can be split when the slices that they represent grow too large, and/or when redistributing rows in the database. For example, if the slice at node 1 grows past a threshold number of rows (e.g., one million rows), it can be split into two or more slices. In that case, the row 1660, having a hash range of 0-255, can be split into a first row having a hash range of 0-127, and a second row having a hash range of 128-255. The hash range of a row being split, however, need not necessarily be split evenly.

FIG. 17 is a schematic diagram illustrating a state of a shadow hash ranges table 1700, in accordance with one embodiment. The shadow hash ranges table 1700, similar to the hash ranges table 1600 (FIG. 16), includes a plurality of columns 1710, 1720, 1730, 1740, and 1750 and a plurality of rows 1760 and 1770. The rows 1760 and 1770 of the shadow hash ranges table 1700 are the result of splitting the row 1660 of the hash ranges table 1600. With reference to FIG. 16, the original slice of table S1 (shown in row 1660 of the hash ranges table 1600), containing 100 rows of data and located on node 1, has been split into a first new slice and a second new slice. With reference to FIG. 17, the first new slice (shown in row 1760 of the shadow hash ranges table 1700) contains 50 rows of data and is located on node 2. The second new slice (shown in row 1770 of the shadow hash ranges table 1700) contains 50 rows of data and is located on node 3.

During the flip operation, discussed above with respect to FIGS. 13 and 14, the shadow hash ranges table 1700 (FIG. 17) can replace the hash ranges table 1600 (FIG. 16). In one embodiment, the rows 1760 and 1770 of the shadow hash ranges table 1700 can simply be copied to the hash ranges table 1600, and the row 1660 of the hash ranges table 1600 can be deleted. In embodiments where there is no shadow hash ranges table, the rows 1760 and 1770 can be inserted into the hash ranges table 1600 before the flip and marked as inactive and/or for queued writing only. After the flip, the rows 1760 and 1770 can be marked as active.

As discussed above with respect to FIG. 3, the database system can perform transactions using Multi-Version Concurrency Control (MVCC). As discussed above with respect to FIG. 6, under MVCC, transactions can take a snapshot of the database state, including the hash ranges table 1600 (FIG. 16) and the shadow hash ranges table 1700 (FIG. 17), when they are initiated. FIGS. 18-22 are schematic diagrams of the data layout of a database system as seen from the perspective of each transaction $T_0$, $T_{15}$, $T_{25}$, $T_{35}$, $T_{45}$, and $T_{55}$ discussed above with respect to FIGS. 6-15.

Figure 18:
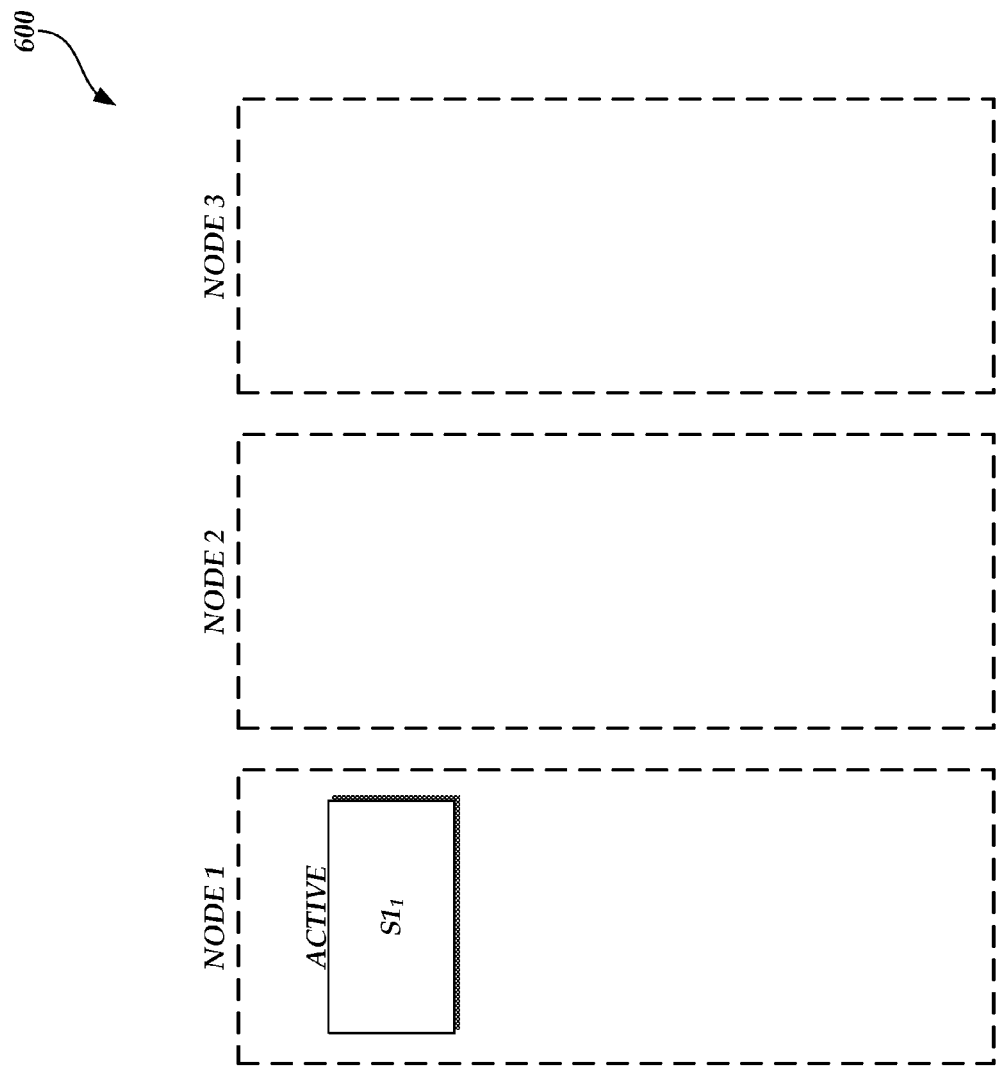
FIG. 18 is a schematic diagram of the data layout of FIG. 6, as seen by a first transaction.

FIG. 18 is a schematic diagram of the data layout 600 of FIG. 6, as seen by the transaction $T_0$. In the illustrated embodiment, the transaction $T_0$, initiated at reference time 0, takes a snapshot of the database state at reference time 0. Accordingly, the transaction $T_0$ sees the data layout 600 as described above with respect to the hash ranges table 1600 (FIG. 16). Specifically, the transaction $T_0$ sees a table S1 having an active slice $S1_1$ residing on node 1.

Figure 19:
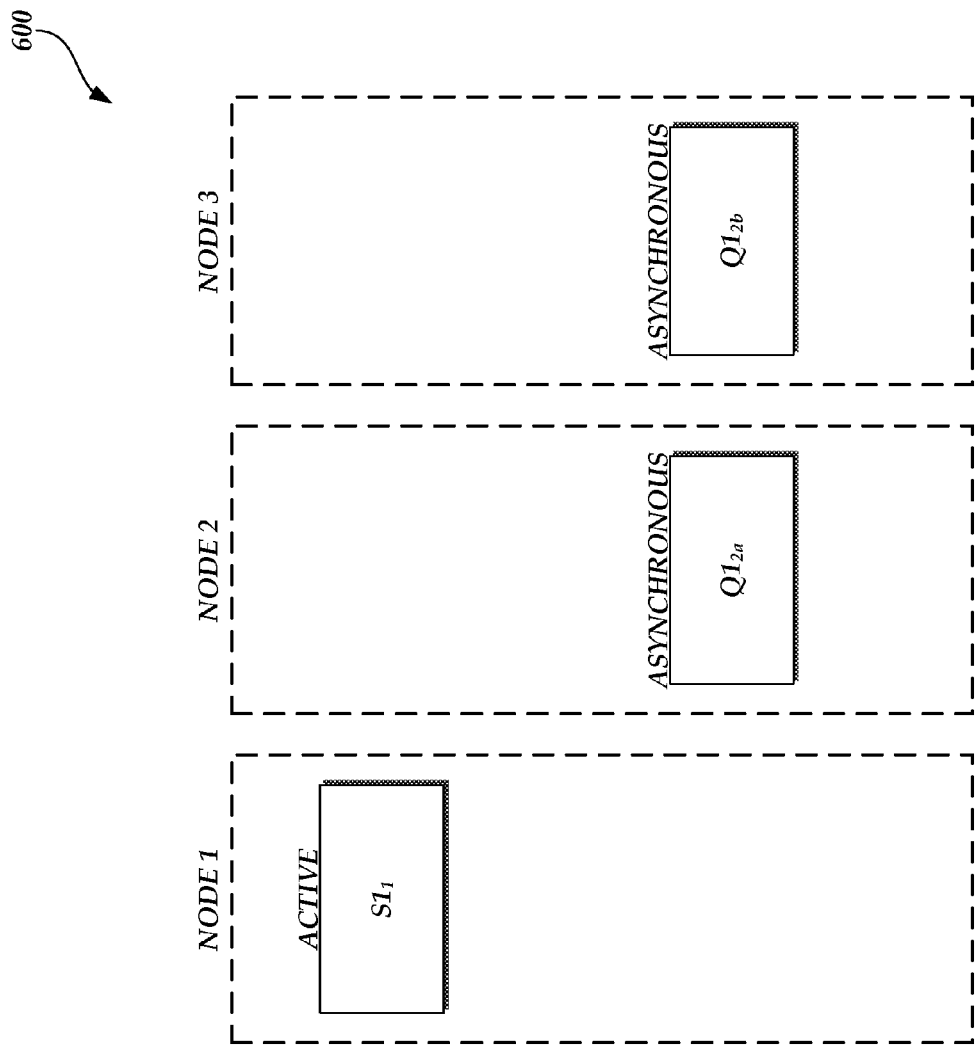
FIG. 19 is a schematic diagram of the data layout of FIG. 6, as seen by a second transaction.

FIG. 19 is a schematic diagram of the data layout 600 of FIG. 6, as seen by the transaction $T_{15}$ and the transaction $T_{25}$. In the illustrated embodiment, the transaction $T_{15}$, initiated at reference time 15, takes a snapshot of the database state at reference time 15. The transaction $T_{25}$, initiated at reference time 25, takes a snapshot of the database state at reference time 25. Accordingly, both the transaction $T_{15}$ and the transaction $T_{25}$ see the data layout 600 as described above with respect to the hash ranges table 1600 (FIG. 16). Specifically, the transaction $T_{15}$ and the transaction $T_{25}$ see a table S1 having an active slice $S1_1$ residing on node 1. Additionally, the transaction $T_{15}$ and the transaction $T_{25}$ see a first asynchronous write queue $Q1_{2a}$, associated with node 2, and a second asynchronous write queue $Q1_{2b}$, associated with node 3.

Figure 20:
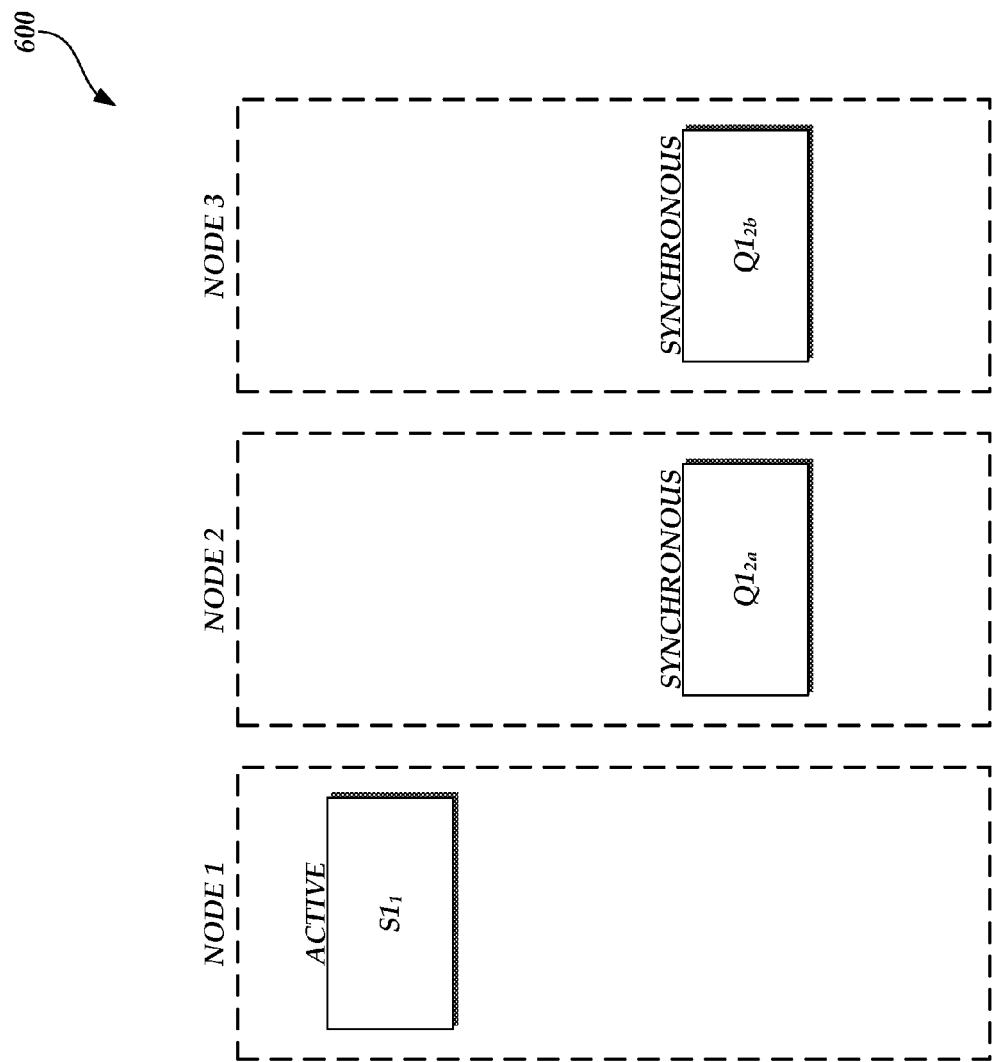
FIG. 20 is a schematic diagram of the data layout of FIG. 6, as seen by a third transaction.

FIG. 20 is a schematic diagram of the data layout 600 of FIG. 6, as seen by the transaction $T_{35}$. In the illustrated embodiment, the transaction $T_{35}$, initiated at reference time 35, takes a snapshot of the database state at reference time 35. Accordingly, the transaction $T_{35}$ sees the data layout 600 as described above with respect to the hash ranges table 1600 (FIG. 16). Specifically, the transaction $T_{35}$ sees a table S1 having an active slice $S1_1$ residing on node 1. Additionally, the transaction $T_{35}$ sees a first synchronous write queue $Q1_{2a}$, associated with node 2, and a second synchronous write queue $Q1_{2b}$, associated with node 3.

Figure 21:
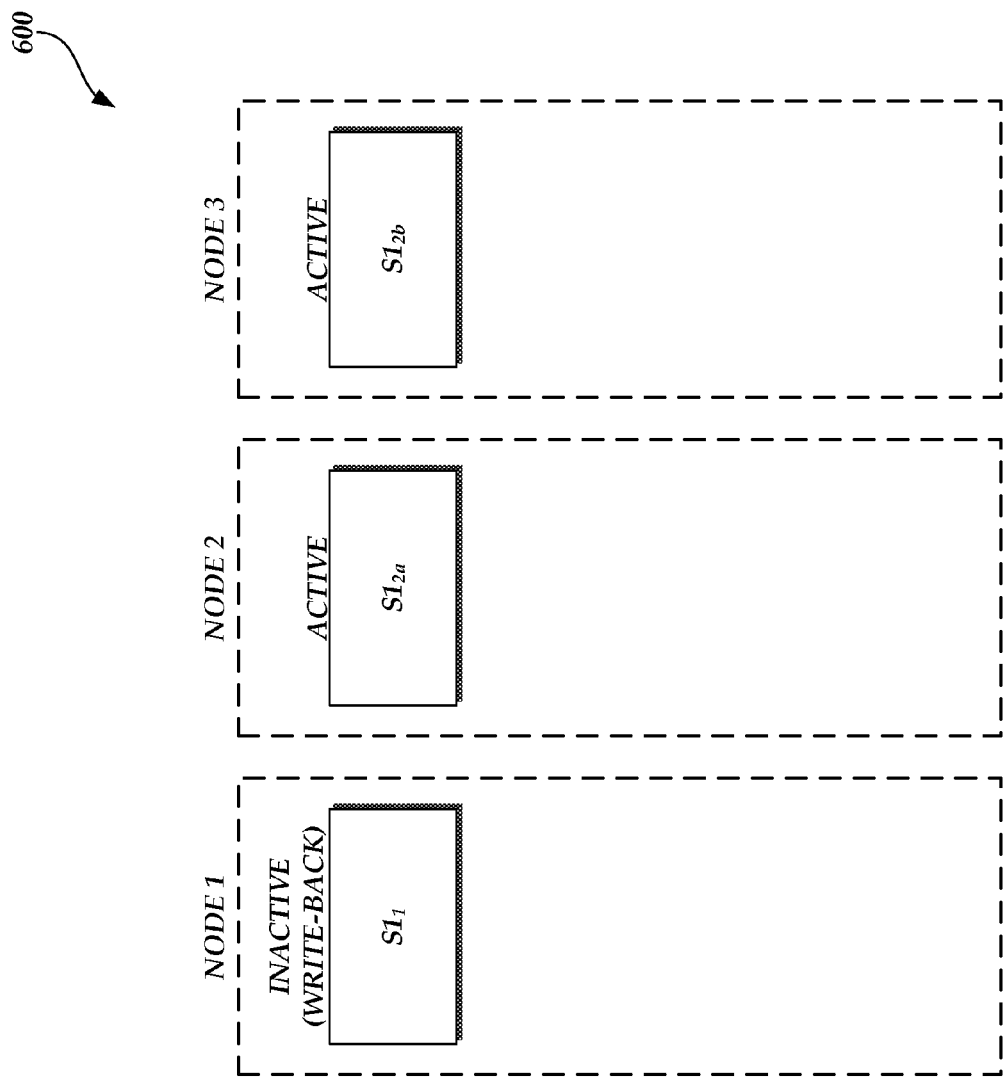
FIG. 21 is a schematic diagram of the data layout of FIG. 6, as seen by a fourth transaction.

FIG. 21 is a schematic diagram of the data layout 600 of FIG. 6, as seen by the transaction $T_{45}$. In the illustrated embodiment, the transaction $T_{45}$, initiated at reference time 45, takes a snapshot of the database state at reference time 45, which is after the flip. Accordingly, the transaction $T_{45}$ sees the data layout 600 as described above with respect to the shadow hash ranges table 1700 (FIG. 17). Specifically, the transaction $T_{45}$ sees a table S1 having an active slice $S1_{2a}$ residing on node 2, and an active slice $S1_{2b}$ residing on node 3. Additionally, the transaction $T_{45}$ sees an inactive slice $S1_1$ residing on node 1, which is marked for write-back. Because the inactive slice $S1_1$ is marked for write-back, the transaction $T_{45}$ forwards its writes to the inactive slice $S1_1$.

Figure 22:
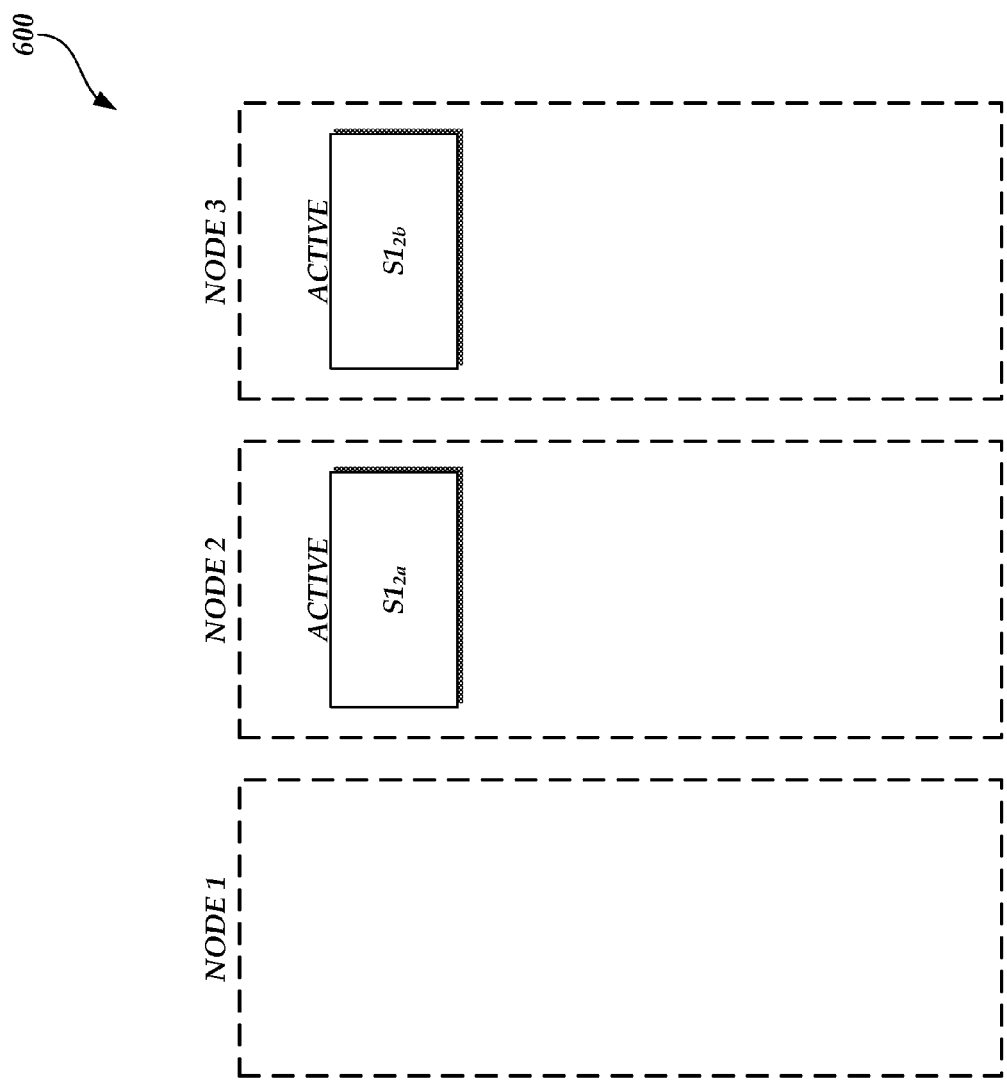
FIG. 22 is a schematic diagram of the data layout of FIG. 6, as seen by a fifth transaction.

FIG. 22 is a schematic diagram of the data layout 600 of FIG. 6, as seen by the transaction $T_{55}$. In the illustrated embodiment, the transaction $T_{55}$, initiated at reference time 55, takes a snapshot of the database state at reference time 55. Reference time 55 is after the flip and after all transactions initiated before the flip have completed. Accordingly, the transaction $T_{55}$ sees the data layout 600 as described above with respect to the shadow hash ranges table 1700 (FIG. 17). Specifically, the transaction $T_{55}$ sees a table S1 having an active slice $S1_{2a}$ residing on node 2, and an active slice $S1_{2b}$ residing on node 3.

FIG. 23 is a schematic timeline of the events shown in FIGS. 6-15. At reference time 0, the transaction $T_0$ is initiated and performs read and write actions on the original slice $S1_1$. At reference time 10, the copy operation $COPY_{10}$ is initiated. Because the transaction $T_0$ has not yet finished writing to the original slice $S1_1$, the copy operation $COPY_{10}$ waits for the transaction $T_0$ to complete. In one embodiment, the copy operation $COPY_{10}$ does not wait for earlier transactions, such as transaction $T_0$, to complete. In embodiments where the copy operation $COPY_{10}$ does not wait, the transaction $T_0$, can be modified to forward write actions to the write queues $Q1_{2a}$, $Q1_{2b}$. At reference time 15, the transaction $T_0$ completes and the copy operation $COPY_{10}$ begins reading rows of data from the original slice $S1_1$ and writing the data to the new slices $S1_{2a}$, $S1_{2b}$ according to the new distribution function that determines how to divide data between the new slices $S1_{2a}$, $S1_{2b}$. Additionally, at reference time 15, the database can transition to an asynchronous state. The asynchronous transaction $T_{15}$ is initiated and performs read and write actions on the original slice $S1_1$ in addition to performing asynchronous write actions on the queues $Q1_{2a}$, $Q1_{2b}$.

At reference time 20, the copy operation $COPY_{10}$ completes and the queues $Q1_{2a}$, $Q1_{2b}$ begin to replay queued actions to the new slices $S1_{2a}$, $S1_{2b}$. In an embodiment, the database system begins throttling one or more transactions writing to the queues $Q1_{2a}$, $Q1_{2b}$ while they replay queued actions to the new slices $S1_{2a}$, $S1_{2b}$. At reference time 25, the asynchronous transaction $T_{25}$ is initiated and performs read and write actions on the original slice $S1_1$ in addition to performing asynchronous write actions on the queues $Q1_{2a}$, $Q1_{2b}$. At reference time 30, the queues $Q1_{2a}$, $Q1_{2b}$ are empty and the database system can transition to a semi-synchronous state. At reference time 35, the synchronous transaction $T_{35}$ is initiated and performs read and write actions on the original slice $S1_1$ in addition to performing synchronous write actions on the queues $Q1_{2a}$, $Q1_{2b}$. The queues $Q1_{2a}$, $Q1_{2b}$ continue to replay queued actions to the new slices $S1_{2a}$, $S1_{2b}$.

At reference time 37, the asynchronous transaction $T_{25}$ completes. At reference time 40, the asynchronous transaction $T_{15}$ completes, at which point there are no more asynchronous transactions pending. Accordingly, the database system activates the new slices $S1_{2a}$, $S1_{2b}$, deactivates the original slice $S1_1$, and can transition to a synchronous state. At reference time 45, the post-flip transaction $T_{45}$ is initiated and performs read and write actions on the new slices $S1_{2a}$, $S1_{2b}$ while forwarding write actions to the original slice $S1_1$. At reference time 50, the synchronous transaction $T_{35}$ terminates. At this point, the reslicing operation can be considered complete. In an embodiment, the transaction $T_{45}$ can stop forwarding write actions to the original slice $S1_1$. Additionally, the original slice $S1_1$ and the queues $Q1_{2a}$, $Q1_{2b}$ can be marked for deletion, deleted, and/or garbage collected. At reference time 55, the transaction $T_{55}$ is initiated and performs read and write actions on the new slices $S1_{2a}$, $S1_{2b}$.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function.

In one or more exemplary aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

When implemented in software, the functions may be stored on or transmitted over as one or more instructions or code on a computer-readable medium. The steps of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the present disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method of splitting a first slice of a representation in a distributed database into a plurality of new slices, the method comprising:
   creating a plurality of write queues, each write queue corresponding to a different one of the new slices;
   copying units of data in the first slice to the new slices according to a distribution function that determines, for each unit of data in the first slice, one of the new slices into which to copy the unit of data;
   asynchronously writing one or more actions of a set of one or more asynchronous database transactions to the first slice, without waiting for each action to succeed before moving on to the next action, wherein each transaction of the set of asynchronous database transactions is initiated after beginning said copying and before completing said copying; and
   asynchronously enqueuing the one or more actions of the set of asynchronous database transactions in the write queues according to the distribution function,
   wherein the method is performed by one or more computing devices.

2. The method of claim 1, further comprising replaying the actions in the write queues to the new slices after completing the copying of data in the first slice to the new slices.

3. The method of claim 2, further comprising controlling a speed of said asynchronously enqueuing the one or more actions of the set of asynchronous database transactions during said replaying the actions in the write queues, such that the actions in the write queues are dequeued faster than new actions are enqueued in the write queues, until the write queues are emptied.

4. The method of claim 2, further comprising:
   synchronously writing one or more actions of a set of one or more synchronous database transactions to the first slice, wherein each transaction of the set of synchronous database transactions is initiated after the write queues are emptied due to said replaying; and
   synchronously enqueuing the one or more actions of the set of synchronous database transactions in the write queues according to the distribution function,
   wherein each transaction of the set of synchronous database transactions is initiated after the write queues are emptied due to said replaying.

5. The method of claim 1, further comprising:
   deactivating the first slice and activating the new slices after the set of asynchronous database transactions terminates;
   writing one or more actions of a set of one or more new-slice database transactions to the new slices according to the distribution function, wherein each transaction of the set of new-slice database transactions is initiated after activating the new slices; and
   writing one or more actions of the set of new-slice database transactions to the first slice until the set of synchronous database transactions terminates.

6. The method of claim 5, further comprising deleting the first slice and the write queues after the set of synchronous database transactions terminates.

7. The method of claim 1, wherein transactions use multi-version concurrency control (MVCC).

8. The method of claim 1, further comprising reading one or more actions of the set of asynchronous database transactions from the first slice.

9. The method of claim 4, further comprising reading one or more actions of the set of synchronous database transactions from the first slice.

10. The method of claim 5, further comprising reading one or more actions of the set of new-slice database transactions from the new slices according to the distribution function.

11. The method of claim 4, wherein replaying the actions in the write queues to the new slices comprises:
   reading a particular action from one of the write queues, the particular action being associated with a particular synchronous database transaction of the set of synchronous database transactions;
   detecting a failure of the particular action;
   updating the particular synchronous database transaction to a failed state; and
   reversing all of the actions of the particular synchronous database transaction that have been written to the first slice and replayed to the queues.

12. A distributed database system comprising one or more processors configured to split a first slice of a representation in the database into a plurality of new slices, the one or more processors being configured to:
   create a plurality of new slices;
   create a plurality of write queues, each write queue corresponding to a different one of the new slices;
   copy units of data in the first slice to the new slices according to a distribution function that determines, for each unit of data in the first slice, one of the new slices into which to copy the unit of data;
   asynchronously write one or more actions of a set of one or more asynchronous database transactions to the first slice, without waiting for each action to succeed before moving on to the next action, wherein each transaction of the set of asynchronous database transactions is initiated after the system begins said copy and before completing said copying; and
   asynchronously enqueue the one or more actions of the set of asynchronous database transactions in the write queues according to the distribution function.

13. The distributed database system of claim 12, wherein the reslicing system is further configured to replay the actions in the write queues to the new slices after completing the copying of data in the first slice to the new slices.

14. The distributed database system of claim 13, wherein the reslicing system is further configured to control a speed of the asynchronous enqueuing of the one or more actions of the set of asynchronous database transactions during the replaying of the actions in the write queues, such that the actions in the write queues are dequeued faster than new actions are being enqueued in the write queues, until the write queues are emptied.

15. The distributed database system of claim 13, wherein the reslicing system is further configured to:
   synchronously write one or more actions of a set of one or more synchronous database transactions to the first slice, wherein each transaction of the set of synchronous database transactions is initiated after the write queues are emptied due to the replaying; and
   synchronously enqueue the one or more actions of the set of one or more synchronous database transactions in the write queues according to the distribution function, wherein each transaction of the set of synchronous database transactions is initiated after the write queues are emptied due to said replaying.

16. The distributed database system of claim 12, wherein the reslicing system is further configured to:
   deactivate the first slice and activate the new slices after the set of asynchronous database transactions terminates;
   write one or more actions of a set of one or more new-slice database transactions to the new slices according to the distribution function, wherein each transaction of the set of new-slice database transactions is initiated after activating the new slices; and
   write one or more actions of the set of new-slice database transactions to the first slice until the set of synchronous database transactions terminates.

17. The distributed database system of claim 16, wherein the reslicing system is further configured to delete the first slice and the write queues after the set of synchronous database transactions terminates.

18. A computer-readable non-transitory storage medium comprising code for splitting a first slice of a representation in a database into a plurality of new slices, the code capable of causing one or more computing devices to:
   create a plurality of new slices;
   create a plurality of write queues, each write queue corresponding to a different one of the new slices;
   copy units of data in the first slice to the new slices according to a distribution function that determines, for each unit of data in the first slice, one of the new slices into which to copy the unit of data;
   asynchronously write one or more actions of a set of one or more asynchronous database transactions to the first slice, without waiting for each action to succeed before moving on to the next action, wherein each transaction of the set of asynchronous database transactions is initiated after the one or more computing devices begin said copy and before completing said copying; and
   asynchronously enqueue the one or more actions of the set of asynchronous database transactions in the write queues according to the distribution function.

19. The distributed database system of claim 18, wherein the reslicing system is further configured to replay the actions in the write queues to the new slices after completing the copying of data in the first slice to the new slices.

20. The distributed database system of claim 19, wherein the reslicing system is further configured to control a speed of the asynchronous enqueuing of the one or more actions of the set of asynchronous database transactions during the replaying of the actions in the write queues, such that the actions in the write queues are dequeued faster than new actions are being enqueued in the write queues, until the write queues are emptied.

21. The distributed database system of claim 19, wherein the reslicing system is further configured to:
   synchronously write one or more actions of a set of one or more synchronous database transactions to the first slice, wherein each transaction of the set of synchronous database transactions is initiated after the write queues are emptied due to the replaying; and
   synchronously enqueue the one or more actions of the first set of one or more synchronous database transactions in the write queues according to the distribution function, wherein each transaction of the set of synchronous database transactions is initiated after the write queues are emptied due to said replaying.

22. The distributed database system of claim 18, wherein the reslicing system is further configured to:
   deactivate the first slice and activate the new slices after the set of asynchronous database transactions terminates;
   write one or more actions of a set of one or more new-slice database transactions to the new slices according to the distribution function, wherein each transaction of the set of new-slice database transactions is initiated after activating the new slices; and
   write one or more actions of the set of new-slice database transactions to the first slice until the set of synchronous database transactions terminates.

23. The distributed database system of claim 22, wherein the reslicing system is further configured to delete the first slice and the write queues after the set of synchronous database transactions terminates.

24. A method of splitting a first slice of a representation in a distributed database into a plurality of new slices, the method comprising:
   creating the new slices;
   creating a plurality of write queues, each write queue corresponding to a different one of the new slices;
   copying units of data in the first slice to the new slices according to a distribution function that determines, for each unit of data in the first slice, one of the new slices into which to copy the unit of data;
   writing one or more actions of one or more database transactions to the first slice after beginning said copying;
   enqueuing the one or more actions of the one or more database transactions in the write queues according to the distribution function; and
   replaying the actions in the write queues to the new slices, wherein the method is performed by one or more computing devices.

25. The method of claim 24, further comprising:
   activating the new slices after said replaying; and
   deactivating the first slice.

26. The method of claim 24, wherein no write locks are applied to the first slice during said copying, writing, enqueuing, and replaying.

27. The method of claim 24, further comprising conducting database transactions associated with the first slice during said copying, writing, enqueuing, and replaying.

28. The method of claim 27, further comprising conducting substantially all received database transactions associated with the first slice during said copying, writing, enqueuing, and replaying.

29. The method of claim 25, further comprising writing the one or more actions of the one or more database transactions to the first slice during said copying.

* * * * *